United States Patent [19]
Kawasaki et al.

[11] Patent Number: 5,677,683
[45] Date of Patent: Oct. 14, 1997

[54] METHOD AND DEVICE FOR TRANSFERRING MESSAGES IN CONNECTIONLESS COMMUNICATION

[75] Inventors: Takeshi Kawasaki; Haruo Mukai, both of Kawasaki, Japan

[73] Assignee: Fujitsu Limited, Kawasaki, Japan

[21] Appl. No.: 392,155

[22] Filed: Feb. 22, 1995

[30] Foreign Application Priority Data

Mar. 18, 1994 [JP] Japan .................................. 6-087122

[51] Int. Cl.⁶ .................................................. H04Q 1/00
[52] U.S. Cl. ................................... 340/827; 379/221
[58] Field of Search ................................ 340/826, 827; 379/221; 370/112

[56] References Cited

U.S. PATENT DOCUMENTS 4,979,118  12/1990  Kheradpir ........................... 340/827
5,181,017  1/1993   Frey ................................... 340/827
5,440,564  8/1995   Ovada ................................ 340/827

Primary Examiner—Brian Zimmerman
Attorney, Agent, or Firm—Staas & Halsey

[57] ABSTRACT

An object of the present invention is to keep the scale of the connectionless function at the minimum and plan the expansion of the network scale and the ability expansion of the exchange in connectionless communication. In order to attain the object, the present invention comprise a destination address detection step for detecting a destination address from a message, a main retrieval step for detecting a routing information corresponding to the destination address from the first register in which only the routing information corresponding to the prescribed number of destination address is registered, a sub-retrieval step for detecting the routing information corresponding to the destination address from the second register in which the routing information corresponding to the all destination address supported by the change is registered, when the routing information corresponding to the destination address is not registered in the first register, and a routing information notification step for notifying the routing information to the exchange, in order to attain the above-mentioned object.

20 Claims, 18 Drawing Sheets

| ADDRESS ID | DESTINATION ADDRESS | RECEIVING DESTINATION ID |
|---|---|---|
| A | XXXX-XXXX | #1 |
| B | PREFIX; (SSSS) | #10 |
| ⋮ | ⋮ | ⋮ |

FIG. 8

| DESTINATION ADDRESS | RECEIVING DESTINATION ID |
|---|---|
| XXXX-XXXX | #1 |
| YYYY-YYYY | #2 |
| PREFIX; (SSSS) | #10 |
| PREFIX; (TTTT) | #11 |
| PREFIX; (UUUU) | #12 |
| ⋮ | ⋮ |

FIG. 9

| ADDRESS ID | ELAPED TIME |
|:---:|:---:|
| A | 0 |
| B | $t_1$ |
| C | $t_2$ |
| ⋮ | ⋮ |

FIG. 10

| DESTINATION ADDRESS | RECEIVING DESTINATION ID |
|---|---|
| XXXX−XXXX | #1, #m, #n, ··· |
| YYYY−YYYY | #2, #o, #p, ··· |
| PREFIX ; (SSSS) | #10, #k, #l, ··· |
| PREFIX ; (TTTT) | #11, #x, #y, ··· |
| PREFIX ; (UUUU) | #12, #z, #w, ··· |
| ⋮ | ⋮ |

FIG. 16

METHOD AND DEVICE FOR TRANSFERRING MESSAGES IN CONNECTIONLESS COMMUNICATION

BACKGROUND OF THE INVENTION

The present invention is related to the method and the device for transferring messages which realize connectionless communication using the public network.

In recent years, the simplification of the processing for accelerating informational communication has been demanded, and the development of connectionless communication, in which a calling process executed in a public telephone network is not necessary, has been promoted.

In connectionless communication, a process of call-setup is not executed when the communication is started, and a transmitter of the message transmits a message to the exchange by adding a destination address of the other party to the message. Then, the exchange analyzes the destination address added to the message to specify the route to the destination or to the relay station (a routing processing), and transfers the message following the route. For this reason, the exchange has to analyze a destination address per message. If is desirable to analyze the destination address at a high speed so as to transfer the message is real time.

The traditional connectionless communication will now be described.

Each exchange of the connectionless communication network is provided with a connectionless function unit which executes the analysis of the destination address and the routing processing.

The connectionless function unit memories the destination address of the all exchanges included in the network and the destination address of the all terminals included in a self-exchanging-network, and memorizes a routing information corresponding to each destination address. Then, the connectionless function unit detects the destination address from the message, when the message reaches the exchange. The connectionless function unit discriminates whether an epistatic prescribed number of digits (for instance, the prefix) are in conformity with the destination address of a self exchanging network. Hereupon, the connectionless function unit confirms that destination to which the message is transmitted is a terminal connected to a self exchange, and detects the routing information transmitted to the terminal, when the epistatic prescribed number of digits are in conformity with the destination address of the self exchanging network. Then, the connectionless function unit transmits the detected routing information to a switching circuit of the exchange. The switching circuit switches the transmission route in accordance with the notified routing information to transmit the message.

On the other hand, the connectionless function unit detects the routing information transmitted to the other exchange, which regards the number of the epistatic prescribed number of digits as the destination address, when the epistatic prescribed number of digits of the destination address are not in conformity with the destination address of the self exchanging network. Then, the connectionless function unit notifies the detected routing information to the switching circuit. The switching circuit switches the transmission route in accordance with the notified routing information to transmit the message.

The problem that the scale expansion of the network is limited exists, since the scale of the above-mentioned connectionless communication network relies upon the memory capacity of the connectionless function unit. It is difficult to increase functions, other than a retrieval function, since the routing information will be also increased if the memory capacity is expanded following the expansion of network, so huge memory resources are needed and a high-speed retrieval function is required.

The present invention is a method and a device for solving the above-mentioned problems. The task of the present invention is to keep the expansion of the connectionless function accompanying the expansion of the network scale at the minimum and promote the functional expansion of the exchange.

SUMMARY OF THE INVENTION

A method and the device for transferring messages in connectionless communication of the present invention will be described briefly.

(1) Method for Transferring Messages in Connectionless Communication

The inventor of the present invention has designed a first method and a second method for transferring messages in connectionless communication.

The first method of the present invention connects a connectionless server which executes the routing of the message to each exchange of the connectionless communication network, or has a built-in connectionless server in each exchange of the connectionless communication network. Further, the connectionless server comprises a first registration means in which only a routing information corresponding to the prescribed number of destination address is registered, and a second registration means for storing the routing information corresponding to the all destination address, as means for registering the routing information per destination address.

Then, the connectionless server executes a destination address detection step for detecting a destination address added to the message, when the exchange receive a message. Secondly, the connectionless server executes a main retrieval step for retrieving the first registration means on the basis of the destination address detected by the destination address detection step. Hereupon, the connectionless server will execute a sub-retrieval step for retrieving the second registration means on the basis of the destination address, if the routing information corresponding to the destination address is not registered in the first registration means.

Then, the connectionless server executes a routing information notification step for notifying the routing information detected by the main retrieval step or the sub-retrieval step to the exchange.

Accordingly, the exchange switches the connection route of the switching circuit on the basis of the routing information notified by the connectionless server to transmit the message.

Further, the connectionless server can execute a address management step for writing the routing information detected from the second registration means and the destination address corresponding to the routing information into the first registration means, when the sub-retrieval step is executed. The address management step should be executed after executing the routing information notification step.

Additionally, a step for registering a new routing information in the first registration means comprises the following steps.

(1) A transmission source address detection step for detecting the address of the transmitter of the message.

(2) A routing information specifying step for specifying the routing information corresponding to the address by refering to the receiving route of the message.

(3) A address management step for writing the address of the transmitter detected by the transmission source address detection step and the routing information specified by the routing information specifying step into the means.

The routing information specifying step shown in (2) discriminates the receiving route of the message by referring to, for instance, the switching circuit which is provided with the exchange, and specifies the routing information. The routing information of the certain area should be rewritten, if the routing information corresponding to the prescribed number of destination address is already registered in the first registration means, when the routing information specified by the sub-retrieval step or the routing information specifying step is registered to the first registration means. The address management step of the present invention can be constructed of the following steps in accordance with the necessity.

(10) A frequency of retrieval discrimination step for discriminating the routing information whose frequency of the retrieval is the smallest out of the each routing information registered in the first registration means.

(11) A rewriting step for rewriting the routing information discriminated by the frequency of the retrieval discrimination step into the routing information retrieved by the sub-retrieval step or the routing information specified by the routing information specifying step.

Besides, the address management step can be constructed of the following steps.

(20) A retrieval-time-discrimination step for discriminating the routing information which has elapsed the fixed time since the last retrieval time out of the routing informations registered in the first registration means.

(21) A delete step for deleting the routing information discriminated by the retrieval time discrimination step from the first registration means.

(22) The routing information writing step for writing the routing information detected by the sub-retrieval step or the routing information specified by the routing information specifying step into the area vacated by the delete step.

Further, the address management step can be constructed of the following steps.

(30) A last-retrieval-time-discrimination step for discriminating the routing information whose last retrieval time is the oldest out of the routing informations registered in the first registration means.

(31) A rewriting step for rewriting the routing information discriminated by the last-retrieval-time-discrimination step into the routing information detected by the sub-retrieval step or the routing information specified by the routing information specifying step.

Then, the second method of the present invention will now be described.

The second method of the present invention connects the connectionless server to the exchange, or has a built-in connectionless server in the exchange, like the first method.

Then, the connectionless server executes the destination address detection step and the main retrieval step. The connectionless server executes the broadcast step for transmitting the message to the all terminals or the exchanges connected to the exchange if the routing information corresponding to the destination address is not registered in the first registration means in the main retrieval step.

Further, the message can be transmitted to at least one exchange or only to the terminal specified by the destination address in the broadcast step.

Additionally, the connectionless server can execute the sub-retrieval step for retrieving the second registration means on the basis of the destination address, after executing the broadcast step. In this case, the connectionless server should execute the address management step for writing the destination address and the routing information detected by the sub-retrieval step into the first registration means. The writing procedure in the address management step is the same as the above-mentioned first method, so a description about the writing procedure will be omitted.

(2). Device for Transferring Messages in Connectionless Communication

Then, a device for transferring messages in connectionless communication of the present invention will be described.

The inventor of the present invention has designed the first device and the second device as a device for transferring messages in connectionless communication.

First of all, the first device of the present invention is a device for realizing the above-mentioned first method for transferring messages.

Namely, the first device connects the connectionless server to the exchange, or has a built-in connectionless server within the exchange. Then, the connectionless server activates the destination address detection means, when the exchange receives the message.

The destination address detection means detects the destination address added to the message, and notifies it to the main retrieval means.

The main retrieval means retrieves the first registration means on the basis of the destination address notified by the destination address detection means. Hereupon, the main retrieval means will transfer the routing information to the routing information notification means, if the routing information corresponding to the above-mentioned destination address is registered in the first registration means.

Then, the routing information notification means transmits the routing information to the exchange. Accordingly, the exchange switches the connection route of the switching circuit in accordance with the routing information received by the routing information notification means to transmit the message.

The connectionless server activates the sub-retrieval means when the routing information corresponding to the above-mentioned destination address is not registered in the first registration means. The sub-retrieval means retrieves the second registration means on the basis of the above-mentioned destination address. Then, the sub-retrieval means detects the routing information corresponding to the above-mentioned destination address from the second registration means, and notifies the routing information to the routing information notification means after that. The routing information notification means transmits the routing information notified by the sub-retrieval means to the exchange. Accordingly, the exchange switches the connection route of the switching circuit in accordance with the routing information received by the routing information notification means to transmit the message. After that, the connectionless server can activate the address management means for writing the destination address and the routing information detected by the sub-retrieval means into the first registration means.

Further, the connectionless server can be provided with a transmission-source-address-detection-means, a routing information specifying means and a address management means.

The transmission source address detection means detects the address of the transmitter of the message, when the exchange receives a message.

The routing information specifying means specifies the routing information transmitted from the exchange to the transmission source by referring to the receiving route of the message.

Then, the address management means writes the address detected by the transmission source address detection means and the routing information specified by the routing information specifying means into the first registration means as a pair.

The address management means can be provided with a frequency of retrieval discrimination unit and a rewriting unit. The frequency of retrieval discrimination unit discriminates the routing information whose frequency of the retrieval is the smallest out of the routing informations registered in the first registration means. The rewriting unit rewrites the routing information discriminated by the frequency of retrieval discrimination unit into the routing information detected by the sub-retrieval means or into the routing information specified by the routing information specifying means.

The address management means can also be provided with a retrieval-time-discrimination unit, a delete unit and a routing information writing unit.

The retrieval-time-discrimination unit discriminates the routing information which has elapsed the fixed time since the last retrieval time out of the each routing information registered in the first registration means. The delete unit deletes the routing information discriminated by the retrieval-time-discrimination unit from the first registration means.

The routing information writing unit writes the routing information and the destination address detected by the sub-retrieval means into the area deleted by the delete unit.

Further, the address management means can be provided with a last-retrieval-time-discrimination-unit and a rewriting unit.

The last-retrieval-time-discrimination unit discriminates the routing information whose last retrieval time is the oldest out of the routing informations registered in the first registration means.

The rewriting unit rewrites the routing information discriminated by the last-retrieval-time-discrimination unit into the routing information detected by the sub-retrieval means or into the routing information specified by the routing information specifying means.

The second device of the present invention will now be described.

The second device of the present invention is a device for realizing the above-mentioned method for transferring messages.

Namely, the second device connects the connectionless server to the exchange, or has a built-in connectionless server within the exchange.

The connectionless server will activate the destination address detection means if the exchange receives the message. The destination address detection means detects the destination address of the destination from the message received by the exchange, and notifies it to the main retrieval means.

The main retrieval means retrieves the first registration means on the basis of the destination address detected by the destination address detection means. Then the main retrieval means will notify the routing information to the routing information report means, if the routing information corresponding to the destination address is registered in the first registration means.

The routing information notification means notifies the routing information detected by the main retrieval means to the exchange.

Accordingly, the exchange switches the connection route of the switching circuit in accordance with the routing information to transmit the message.

The connectionless server also activates the broadcast means when the routing information corresponding to the destination address is not registered in the first registration means.

The broadcast means transfers the message to the all exchanges or the terminals connected to the exchange.

Further, the broadcast means can transmit the message to at least one exchange or only to the terminal specified by the destination address.

Moreover, the connectionless server activates the sub-retrieval means after the broadcast means transmits the messages. The sub-retrieval means retrieves the second registration means on the basis of the destination address to detect the routing information corresponding to the above-mentioned destination address. Then, the sub-retrieval means notifies the destination address and the routing information to the address management means.

The address management means registers the destination address and the routing information notified by the sub-retrieval means to the first registration means. The construction of the address management means should be the same as the above-mentioned first device.

The connectionless server can also be provided with a transmission-source-address-detection-means and a routing information specifying means.

The transmission source address detection means detects the address of the transmission source from the message, when the exchange receives a message. Then, the routing information specifying means specifies the routing information transmitted from the exchange to the transmission source on the basis of the receiving route of the message. The address detected by the transmission source address detection means and the routing information specified by the routing information specifying means will be notified to the address management means. The address management means registers the address notified by the transmission source address detection means and the routing information notified by the routing information specifying means to the first registration means as a pair.

Accordingly, the present invention can minimize the resource allocated to the retrieval function, since it is provided with a function for retrieving a part of the destination address supported by the exchange using the closed nature of the connectionless communication.

The present invention will be able to execute the retrieval efficiently by executing the registration or the rewriting of the destination address in the retrieval function, using the interactive nature of the connectionless communication.

BRIEF DESCRIPTION OF THE DRAWINGS

FIG. 8 is example of the receiving destination ID memory.

FIG. 9 is example of the database.

FIG. 10 is example of the elapsed time storage unit.

FIG. 16 is an example of the broadcast list according to the fourth embodiment.

DESCRIPTION OF THE PREFERRED EMBODIMENTS

<First Embodiment>

Figure 1:
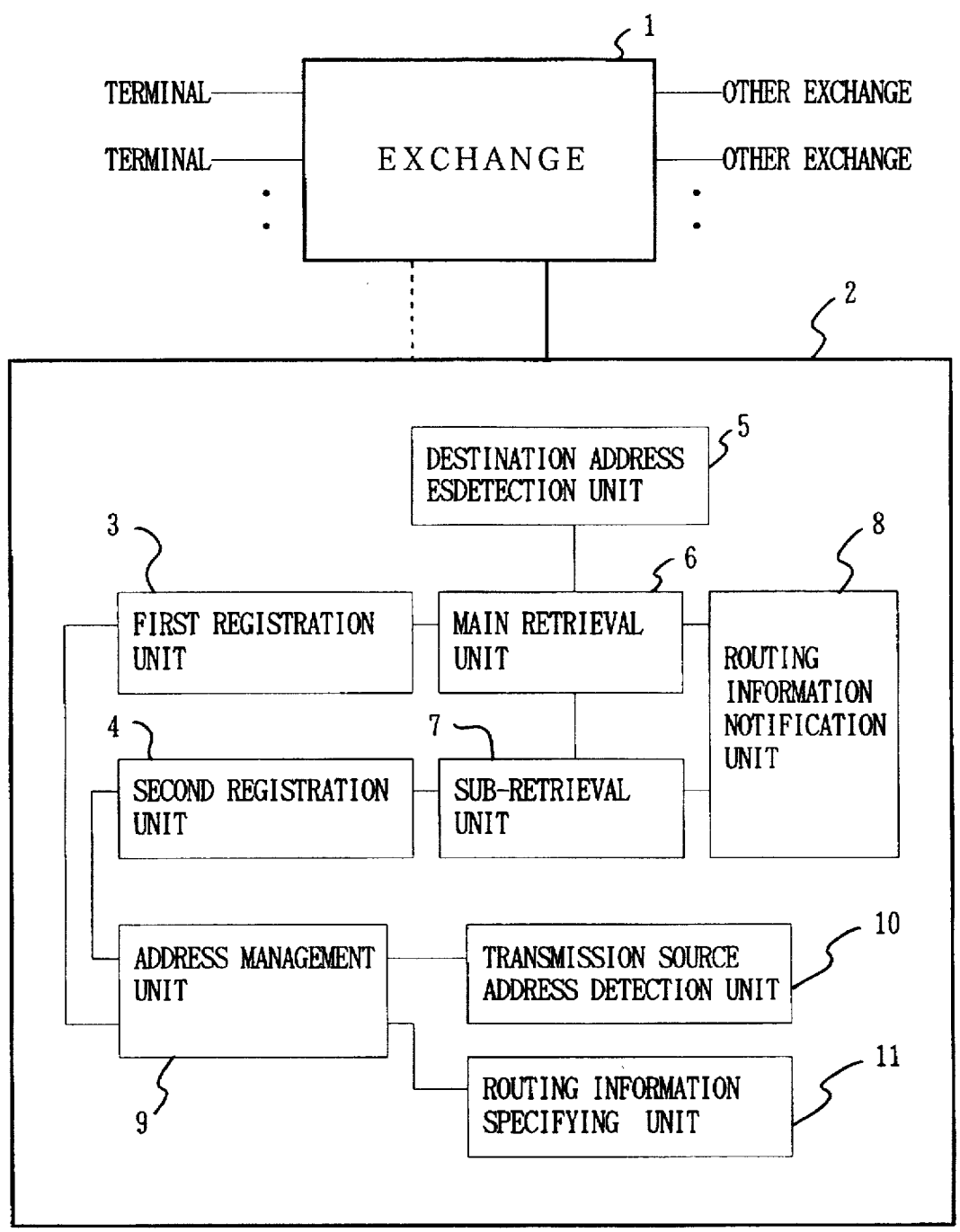
FIG. 1 is a block diagram of the device for transferring messages according to the first embodiment.

The schematic construction of the device for transferring messages according to the first embodiment is shown in FIG. 1.

The device for transferring messages connects the connectionless server 2 to the exchange 1. The connectionless server 2 generally the first registration unit 3 and the second registration unit 4.

The prescribed number of destination address and the routing information corresponding to each of the destination address are registered in the first registration unit 3.

The routing information corresponding to each destination address is registered in the second registration unit 4.

The connectionless server 2 further comprises a destination address detection unit 5, a main retrieval unit 6 and a sub-retrieval unit 7.

The destination address detection unit detects the destination address of the transmitting destination when the connectionless server 2 receives the message.

The main retrieval unit 6 will retrieve the first registration unit 3 on the basis of the destination address detected by the destination address detection unit 5, and will detect the routing information corresponding to the destination address if the destination address is registered.

The sub-retrieval unit 7 retrieves the second registration unit 4 on the basis of the destination address to detect the routing information corresponding to the destination address, when the destination address is not registered in the first registration unit 3.

Then, the routing information notification unit 8 notifies the routing information detected by the main retrieval unit 6 or the sub-retrieval unit 7.

Further, the connectionless server 2 is provided with a address managementunit 9 for writing the address detected by the sub-retrieval unit 7 and the routing information corresponding to it into the first registration unit 3.

The connectionless server 2 additionally comprises a transmission source address detection unit 10 and a routing information specifying unit 11.

The transmission source address detection unit 10 detects the address of the transmission source from the message, when the exchange 1 receives a message.

The routing information specifying unit 11 specifies the routing information transmitted from the exchange 1 to the transmission source by referring to the transmission route from the transmission source of the message to the exchange.

The address managementunit 9 should be provided with a function for registering the address detected by the transmission source address detection unit 10 and the routing information specified by the routing information specifying unit 11 in the first registration unit as a pair. To put it concretely, the address managementunit 9 comprises a frequency of retrieval discrimination unit (not shown) and a rewriting unit (not shown).

The frequency of retrieval discrimination unit discriminates the routing information whose frequency of the retrieval is the smallest out of the routing informations registered in the first registration unit 3.

The rewriting unit rewrites the routing information discriminated by the frequency of retrieval discrimination unit into the routing information detected by the sub-retrieval unit 7 or into the routing information specified by the routing information specifying unit 11.

Figure 2:
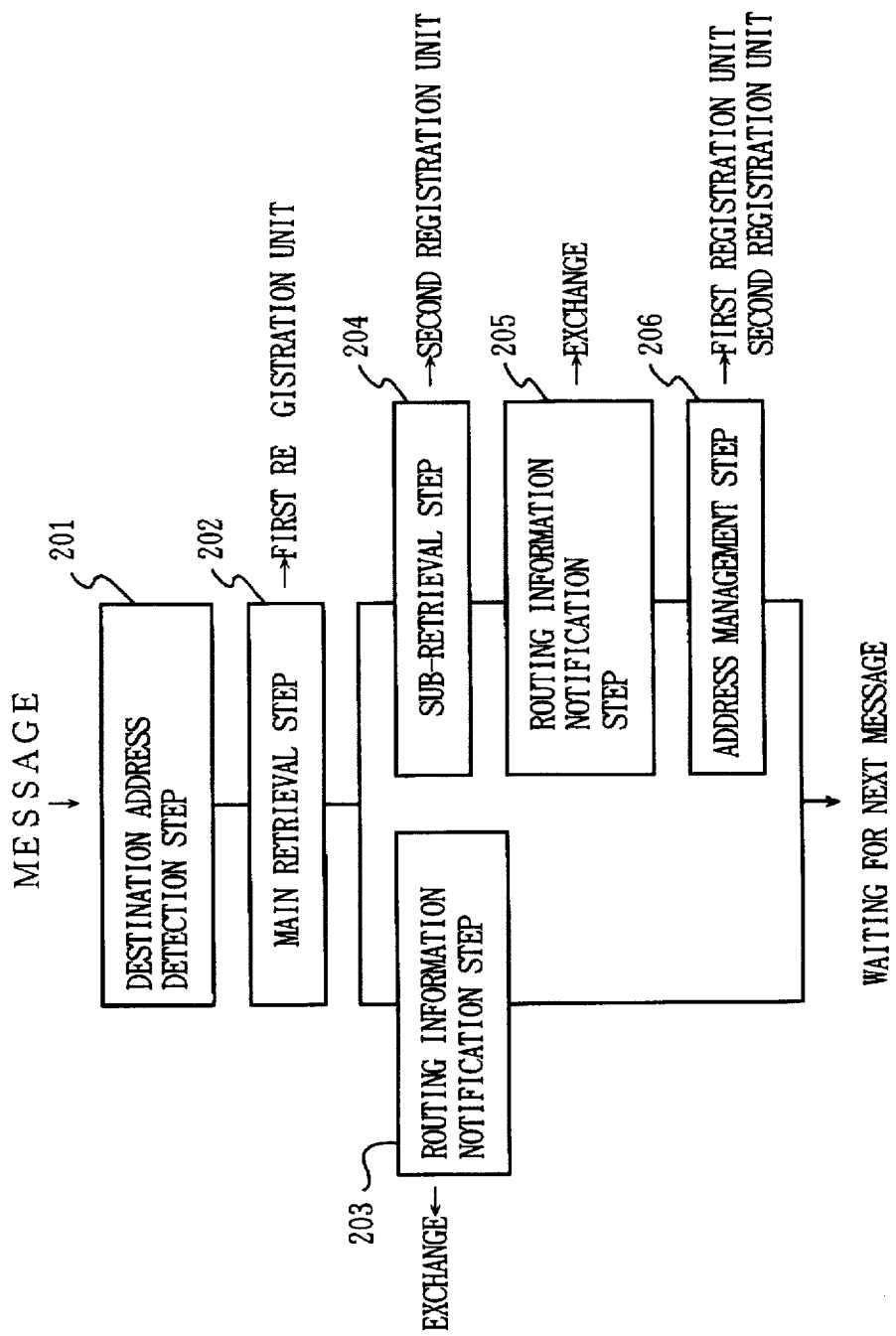
FIG. 2 is an operation flowchart of the connectionless server according to the first embodiment.

The operation of the device for transferring messages according to the first embodiment will be described using the flowchart of FIG. 2 as follows.

The connectionless server 2 will activate the destination address detection unit 5 if the exchange 1 receives the messages from the random terminal.

The destination address detection unit 5 detects the destination address of the transmitting destination from the message, and notifies it to the main retrieval unit 6 (Step 201).

The main retrieval unit 6 retrieves the first registration unit 3 on the basis of the destination address notified by the destination address detection unit 5 (Step 202). Hereupon, the main retrieval unit 3 notifies the routing information to the routing information notification unit 8, when the routing information corresponding to the destination address is registered in the first registration unit 3.

The routing information notification unit 8 notifies the routing information notified by the main retrieval unit 6 to the exchange 1 (Step 203).

Accordingly, the exchange 1 switches the connection route of the switching circuit on the basis of the routing message notified by the main retrieval unit 6 to transmit the message to the transmitting destination.

The main retrieval unit 5 notifies the destination address to the sub-retrieval unit 7, when the routing information corresponding to the destination address is not registered in the first registration unit 3 in Step 202.

The sub-retrieval unit 7 retrieves the second registration unit 4 on the basis of the destination address to detect the routing information corresponding to the destination address. Then, the sub-retrieval unit 7 notifies the detected routing information to the routing information notification unit 8 (Step 204).

The routing information notification unit 8 notifies the routing information to the exchange 1 like the above-mentioned Step 203 (Step 205).

Further, the address managementunit 9 activates the frequency of retrieval discrimination unit. The frequency of retrieval discrimination unit discriminates the routing information whose frequency of the retrieval is the smallest out of the routing informations registered in the first registration unit 3. Then, the rewriting unit rewrites the routing information discriminated by the frequency of retrieval discrimination unit into the routing information detected by the sub-retrieval unit 7 (Step 206).

Figure 3:
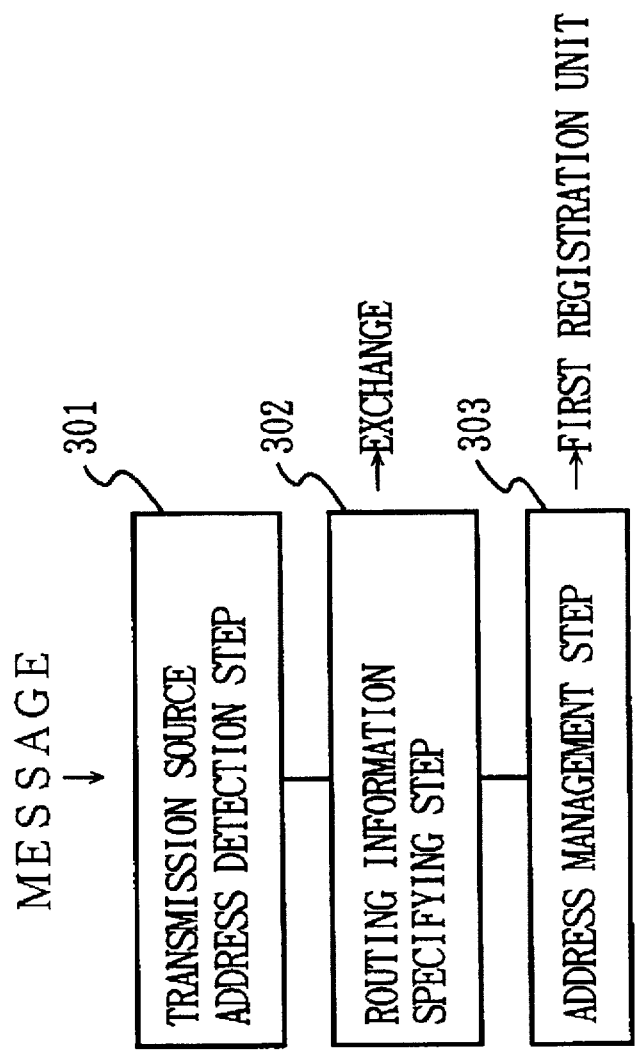
FIG. 3 is a flowchart diagram indicating the renewal processing process of the first registration unit.

The renewal processing of the first registration unit 3 will be described using the flowchart of FIG. 3.

The connectionless server activates the transmission source address detection unit 10 and the routing information specifying unit 11, when the exchange receives the message.

First of all, the transmission source address detection unit 10 detects the address of the transmission-source-terminal of the message from the message. Then, the transmission source address detection unit 10 notifies the detected address to the address managementunit 9 (Step 301).

The routing information specifying unit 11 specifies the routing information transmitted from the exchange 1 to the transmission source terminal by referring to the transmission route through which the message has passed until it reached the exchange 1 from the transmission source terminal. The routing information specifying unit 11 notifies the specified routing information to the address managementunit 9 (Step 302).

Hereupon, the address managementunit 9 activates the frequency of retrieval discrimination unit after receiving the address from the transmission source address detection unit 10 and receiving the routing information from the routing information specifying unit 11. The frequency of retrieval discrimination unit discriminates the routing information whose frequency of the retrieval is the smallest out of the routing informations registered in the first registration unit 3. Then, the rewriting unit rewrites the routing information discriminated by the frequency of retrieval discrimination unit using the address notified by the transmission source address detection unit 10 and the routing information notified by the routing information specifying unit 11 (Step 303).

Moreover, although the address managementunit 9 comprises a frequency of retrieval discrimination unit and a rewriting unit in the first embodiment 1, it can be provided with a retrieval-time-discrimination unit for discriminating the routing information which has elapsed the fixed time since the last retrieval time out of the routing informations registered in the first registration unit 3, a delete unit for deleting the routing information discriminated by the retrieval-time-discrimination unit from the first registration unit 3 and a routing information writing unit for writing the routing information detected by the sub-retrieval unit 7 or the routing information specified by the routing information specification unit 11 into the area deleted by the delete unit.

Besides, the address managementunit 9 can be provides with a last-retrieval-time-discrimination unit for discriminating the routing information whose last retrieval time is the oldest out of the each routing information registered in the first registration unit 3 and a rewriting unit for rewriting the routing information discriminated by the last-retrieval-time-discrimination unit into the routing information detected by the sub-retrieval unit 7 (or the routing information specified by the routing information specifying unit 11).

The message transmission can be executed efficiently without increasing the memory resources according to the first embodiment.

<Embodiment>

The second embodiment of the present invention will be described following the drawings.

Figure 4:
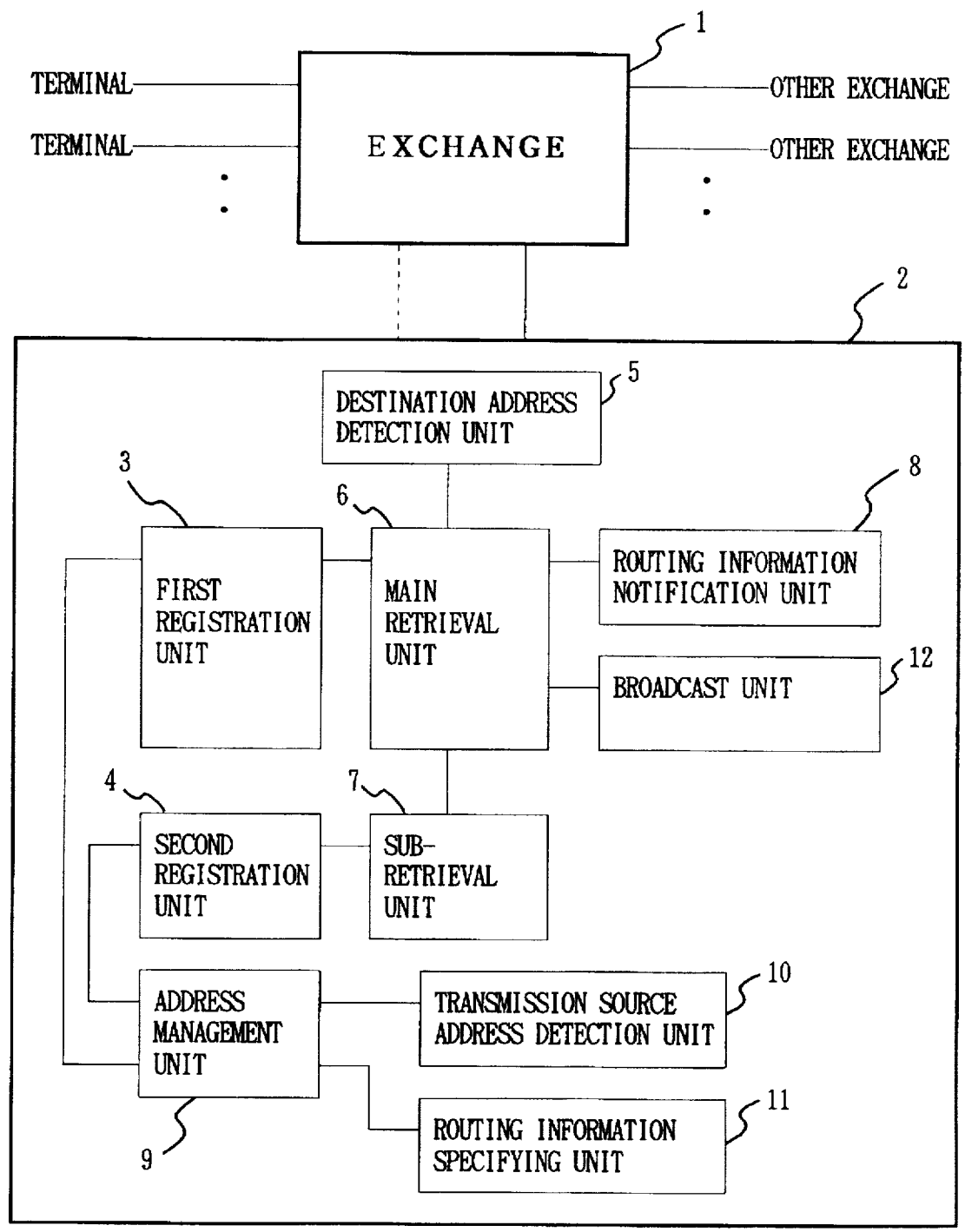
FIG. 4 is a block diagram of the device for transferring messages according to the second embodiment.

FIG. 4 indicates the construction of the device for transferring messages according to the second embodiment.

The device for transferring messages is constructed connecting the connectionless server 2 to the exchange 1.

The connectionless server 2 is provided with a broadcast unit 12 in addition to the above-mentioned construction of the connectionless server of the first embodiment.

The broadcast unit 12 transfers the message to all of the exchanges 1 or the terminals connected to the exchange 1, when the routing information corresponding to the destination address is not registered in the first registration unit 3.

Figure 5:
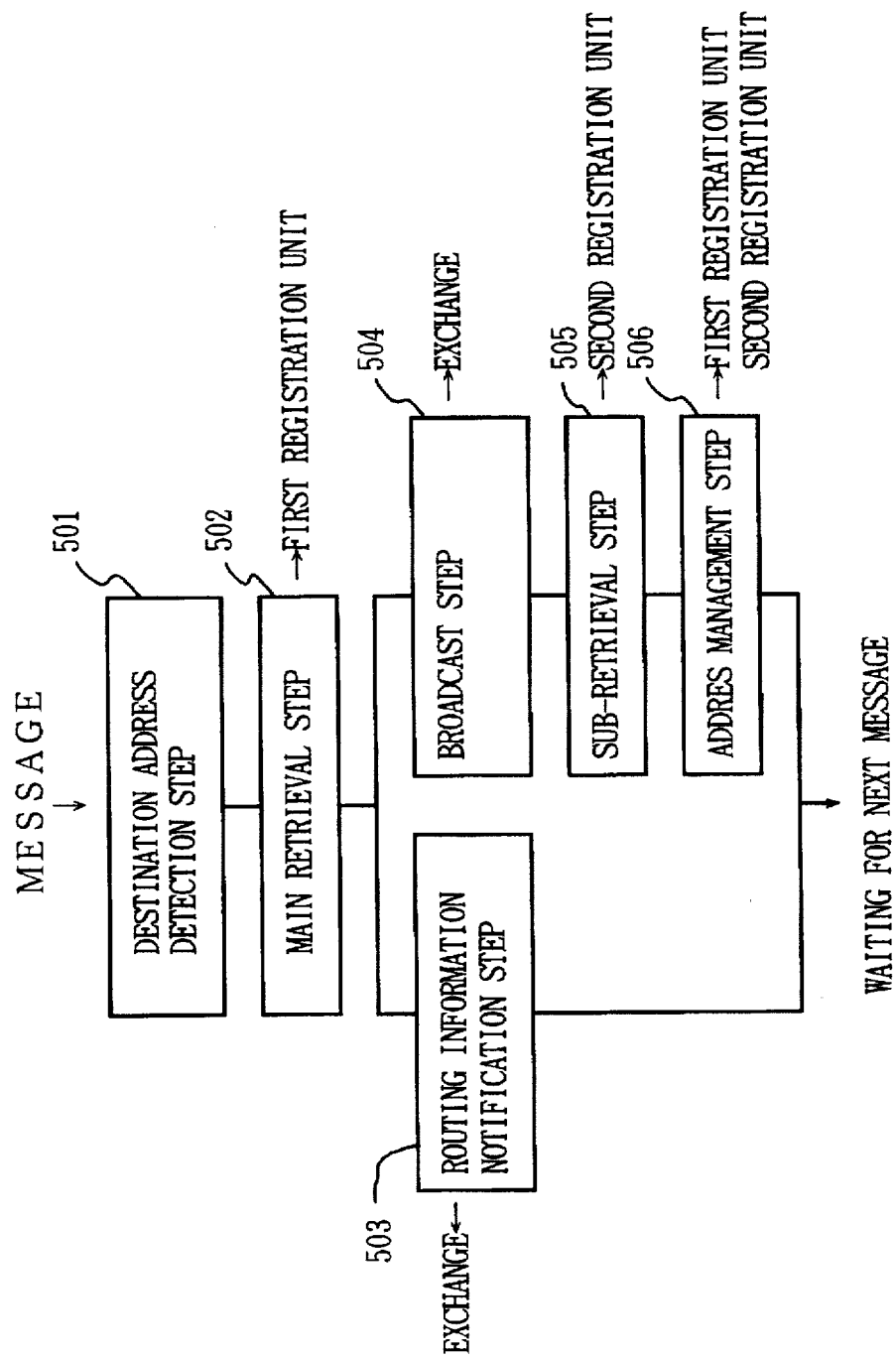
FIG. 5 is an operation flowchart of the connectionless server according to the second embodiment.

The operation of the connectionless server 2 according to the second embodiment will be described using the flowchart diagram of FIG. 5 as follows.

The connectionless server 2 activates the destination address detection unit 5 when the connectionless server 2 receives the message. The destination address detection unit 5 detects the destination address of the transmitting destination from the message, and notifies it to the main retrieval unit 6 (Step 501).

The main retrieval unit 6 retrieves the first registration unit 3 on the basis of the destination address notified by the destination address detection unit 5 (Step 502). Hereupon, the main retrieval unit 3 notifies the routing information to the routing information notification unit 8, when the routing information corresponding to the destination address is registered in the first registration unit 3.

The routing information notification unit 8 notifies the routing information notified by the main retrieval unit 6 to the exchange 1 (Step 503).

Accordingly, the exchange 1 switches the connection route of the switching circuit on the basis of the routing information notified by the connectionless server 2 to transmit the message to the transmitting destination.

The connectionless server 2 activates the broadcast unit 12 when the routing information corresponding to the destination address is not registered in the first registration unit 3 in the Step 502.

The broadcast 12 transmits the message to all of the exchanges 1 or the terminals connected to the exchange 1(Step 504).

Then, the connectionless server 2 activates the sub-retrieval unit 7 when the transmission processing of the messages is completed. The sub-retrieval unit 7 retrieves the second registration unit 4 on the basis of the destination address detected by the destination address detection unit 5. And the sub-retrieval unit 7 notifies the routing information detected by the second registration unit 4 to the address managementunit 9 (Step 505).

The address managementunit 9 activates the frequency of retrieval discrimination unit. The frequency of retrieval discrimination unit discriminates the routing information whose frequency of the retrieval is the smallest out of the routing informations registered in the first registration unit 3. Then, the rewriting unit rewrites the routing information discriminated by the frequency of retrieval discrimination unit into the routing information detected by the sub-retrieval unit 7 (Step 506).

The renewal processing of the first registration unit 3 according to the second embodiment is the same as the above-mentioned first embodiment, so the description about the renewal processing will be omitted.

As mentioned hereinbefore, according to the second embodiment, the message can be transmitted without a delay by using the broadcast communication , even if the message is a message whose routing information is not registered in the first registration unit 3.

Further, the message can be transmitted to at least one exchange or the terminal specified by the destination address, even though the broadcast 12 transmits the messages to all of the exchanges 1 or to the terminal in the second embodiment.

<Embodiment>

Figure 6:
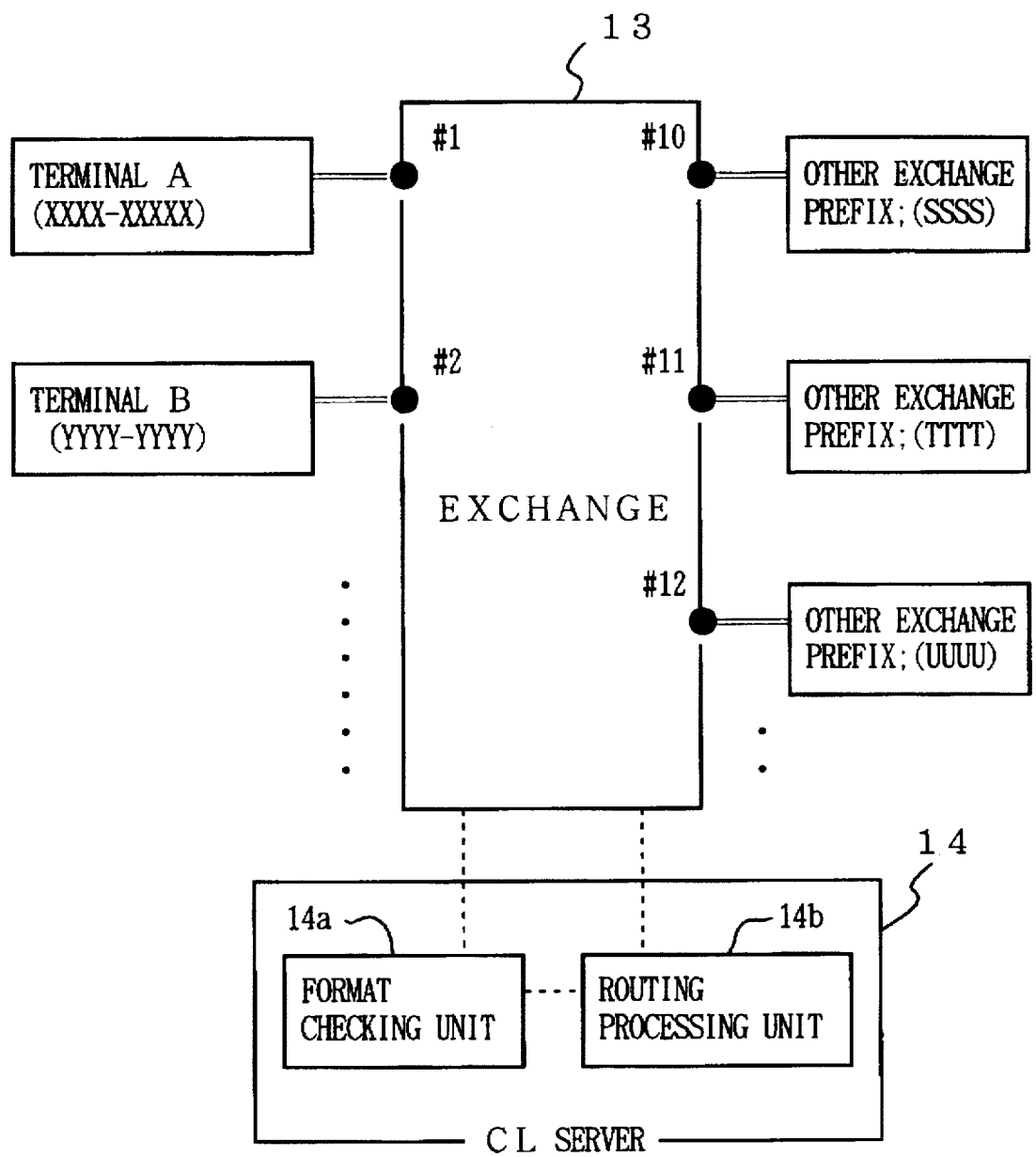
FIG. 6 is a schematic block diagram of the device for transferring messages according to the third embodiment.

The schematic construction of the connectionless communication network according to the third embodiment is shown in FIG. 6.

The device for transferring messages of the third embodiment is constructed connecting the connectionless server 14 to the exchange 13.

<Construction of Connectionless Server 14>

The connectionless server 14 comprises a format checking unit 14a and a routing processing unit 14b.

(1) Format Checking Unit 14

The format checking unit 14a discriminates whether the format of the transmitted and received messages is a format which is in conformity with the communication protocol of the exchange network managed by the exchange 13 or not. Then, the format checking unit 14a transmits only a message whose format is in conformity with the communication protocol to the routing processing unit 14b.

(2) Routing Processing Unit 14b

The routing processing unit 14b analyzes the messages transferred from the format checking unit 14a to detect a destination address of the destination side terminal which is the transmitting destination of the message. Then, the routing processing unit 14b discriminates the transmission routing of the message on the basis of the destination address. Further, in the third embodiment, a subscriber's circuit whose trailer is connected to the terminal and a relay circuit whose trailer is connected to other exchange are connected to each port of the exchanges 13, and a receiving destination ID (#1, #2, #10, #11, #12 . . . ) which specifies the terminal of the circuit trailer or the exchanges separately is added to each port of the exchanges 13. Accordingly, the routing processing unit 14b retrieves the receiving destination ID corresponding to the destination address of the message, and notifies the receiving destination ID to the exchange as a routing information. The exchange 13 switches the connection route of the switching circuit on the basis of the receiving destination ID to transmit the message from the port corresponding to the receiving destination ID.

Figure 7:
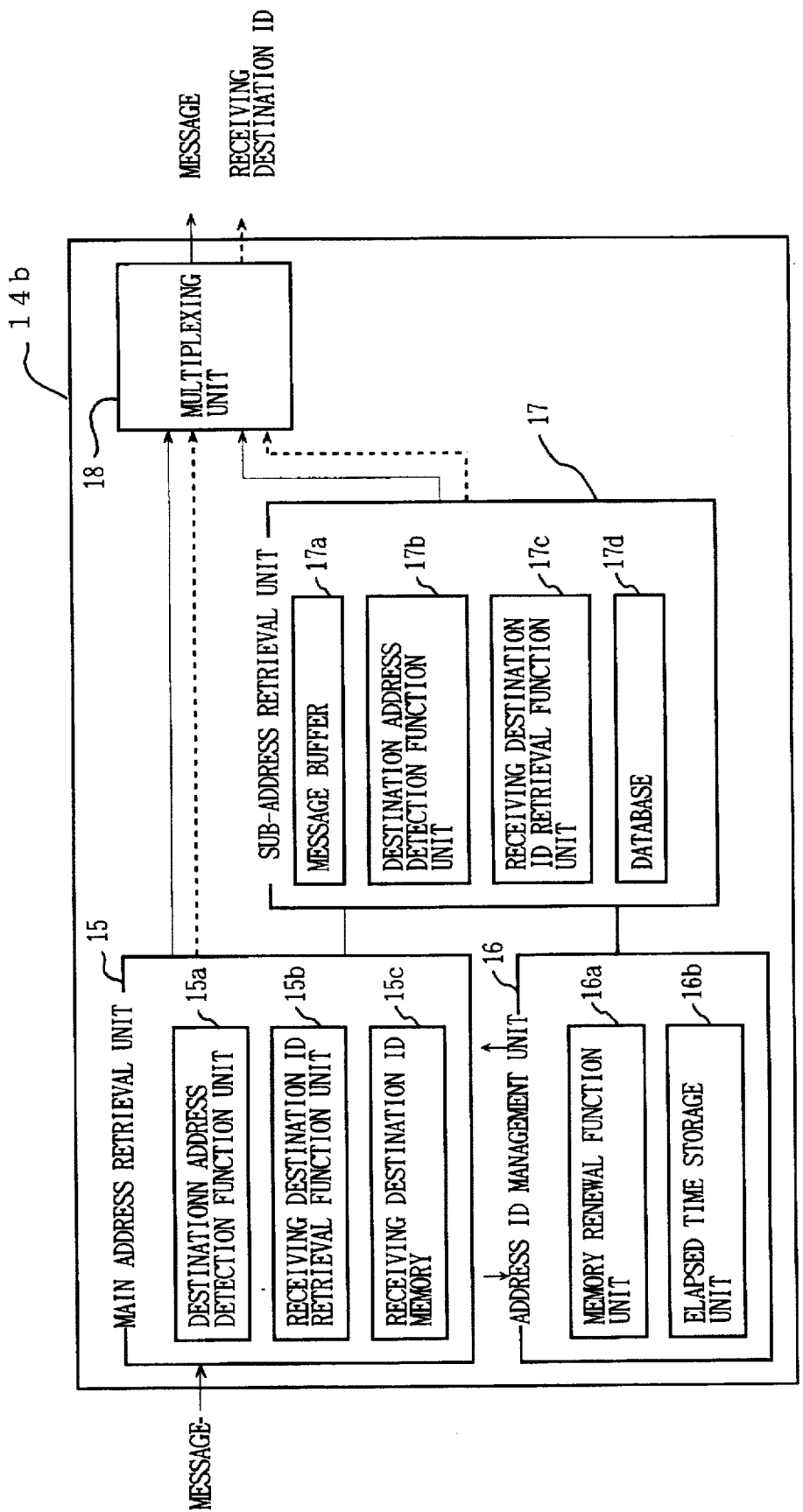
FIG. 7 is a block diagram by function of the routing processing unit according to the third embodiment.

The functions of the routing processing unit 14b will be described in detail as follows. FIG. 7 is a block diagram indicating the internal construction of the routing processing unit 14b by function according to the third embodiment.

The routing processing unit 14b comprises a main address retrieval unit 15, a sub-address retrieval unit 17, an address ID management unit 16 and a multiplexing unit 18. The function of each unit will be described as follows.

Main Address Retrieval Unit 15

The main address retrieval unit 15 comprises a receiving destination ID memory 15c, a destination address detection function unit 15a and a receiving destination ID retrieval function unit 15b.

The prescribed number of destination address, the receiving destination ID corresponding to each of the destination address, and address IDs as memory addresses are registered in the receiving destination ID memory 15c (See FIG. 8).

The destination address detection function unit 15a has a function for detecting an address of the destination from the message.

The receiving destination ID retrieval function unit 15b has a function for retrieving the receiving destination ID memory 15c to read the address ID and the receiving destination ID corresponding to the destination address detected by the destination address detection function unit 15a.

Then, the main address retrieval unit 15 will transfer the destination ID and the message to the multiplexing unit 18, if the destination address of the message is registered in the receiving destination ID memory 15c. On the other hand, the main address retrieval unit 15 will transfer the message to the sub-address retrieval unit 17, if the destination address of the message is not registered in the receiving destination ID memory 15c.

The functions of the sub-address retrieval unit 17 will now be described.

Sub-Address Retrieval Unit 17

The sub-address retrieval unit 17 comprises a database 17d, a message buffer 17a, a destination address detection function unit 17b and a receiving destination ID retrieval function unit 17c.

All exchanges which can be transmitted/received from the exchange 13 and the receiving destination ID of all terminals connected to the exchange 13 are registered in the database 17d (See FIG. 9).

Further, for instance, the prefix consisting of the epistatic prescribed number of digits of the telephone number should be used as a destination address of the exchange.

The message buffer stores the messages temporarily.

The destination address detection function unit 17b has a function for detecting the address of the destination from the message stored in the message buffer 17a.

The receiving destination ID retrieval unit 17c has a function for retrieving the database 17d to read the receiving destination ID corresponding to the destination address detected by the destination address detection function unit 17b.

Further, the main address retrieval unit 15 should have a higher speed throughput compared with the sub-address retrieval unit 17.

Address ID Management Unit 16

The address ID management unit 16 comprises an elapsed time storage unit 16b and a memory renewal unit 16a.

Figure 10:
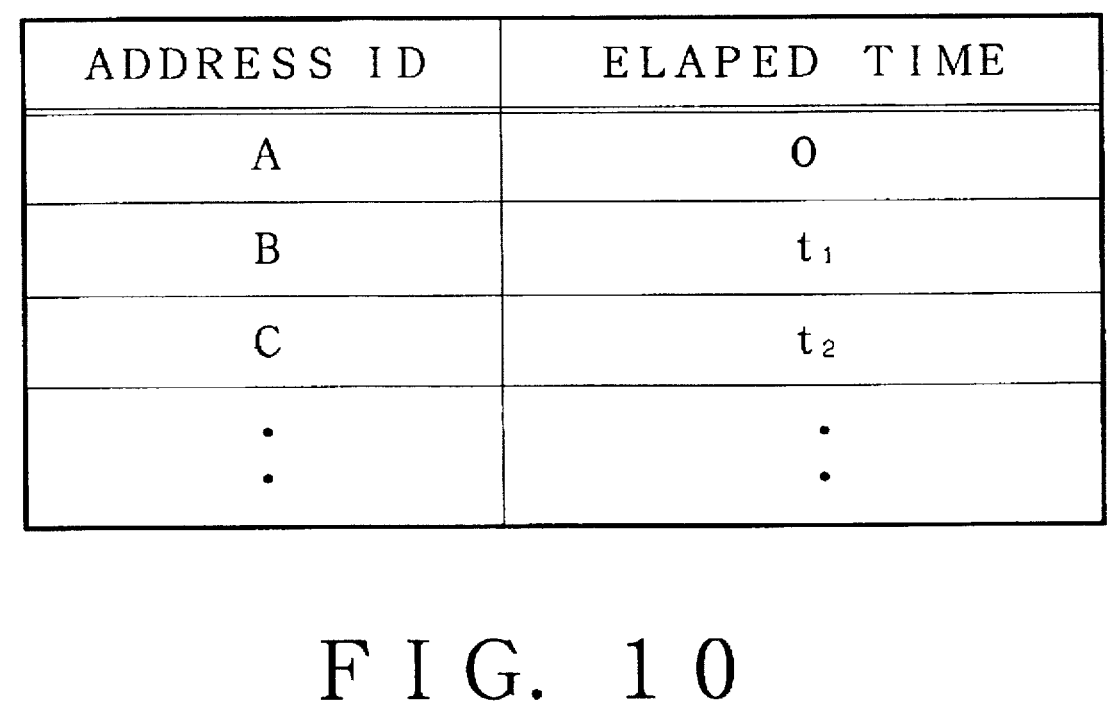

The elapsed time storage unit 16b registers a retrieval time of the address ID registered in the main address retrieval unit 15. To put it concretely, the elapsed time storage unit 16b registers the elapsed time since the point of time that the retrieval has been executed for the last time per address ID. The elapsed time should be reset whenever the address ID is retrieved. An example of the elapsed time storage unit 16b is shown in FIG. 10. In FIG. 10, the address ID is a pointer or an address which specifies the storage position of the destination address in the main address retrieval unit 15. The elapsed time is set to "0" when the destination address is retrieved and is renewed per second, per minute or per hour after that. Then, the elapsed time storage unit 16b notifies the address of the receiving destination whose elapsed time has reached the fixed time to the memory renewal function unit 16a. On the other hand, the clocking of the elapsed time is restarted from the point of time that the elapsed time is reset to "0", in relation to the address ID which was retrieved for the second time before the fixed time has elapsed.

The memory renewal function unit 16a has a function for monitoring the elapsed time storage unit 16b and detecting the address ID that has elapsed the fixed time or so since the point of the time that the last retrieval was executed to delete the address ID from the main address retrieval function unit 15. Further, the memory renewal function unit 16a has a function for registering the address ID to the main address retrieval unit 15, when the destination address ID of the message was detected by the sub-address retrieval unit 17.

Multiplexing Unit 18

The multiplexing unit 18 has a function for multiplexing the message and the receiving destination ID outputted from the main address retrieval unit 15 or the sub-address retrieval unit 17, and notifying them to the exchange.

The operation of the connectionless server 14 will now be described.

<Operation of Connectionless Server 14>

In the device for transferring messages in connectionless communication, the message should be transferred to the connectionless server 14, when the exchange 13 receives the message. First of all, the connectionless server activates the format checking unit 14.

The format checking unit 14 checks whether the format of the message is a format which is in conformity with the concerned communication network or not. Then, the format checking unit 14 will transfer the message to the routing processing unit 14b, if the format of the message is in conformity with the concerned communication network. The routing processing unit 14b discriminates the destination of the message to detect the routing information transmitted to the destination from the concerned exchange 13. The routing processing unit 14b notifies the message and the routing information to the exchange 13.

Hereupon, the operation of the routing processing unit 14b will be described in detail.

Operation of Routing Processing Unit 14b

A message addressed to the terminal A according to FIG. 6 will be described as an example in the third embodiment.

The routing processing unit 14b receives the message addressed to the terminal A from the format checking unit 14a, and inputs the message into the main address retrieval unit 15.

The destination address detection function unit 15a of the main address retrieval unit 15 detects the destination address (XXXX-XXXX) of the terminal A from the message, and notifies it to the receiving destination ID retrieval function unit 15b.

The receiving destination ID retrieval unit 15b retrieves the receiving destination ID memory 15c on the basis of the destination address (XXXX-XXXX) to discriminate whether the receiving destination ID (#1) of the terminal A is registered in it or not.

Figure 11:
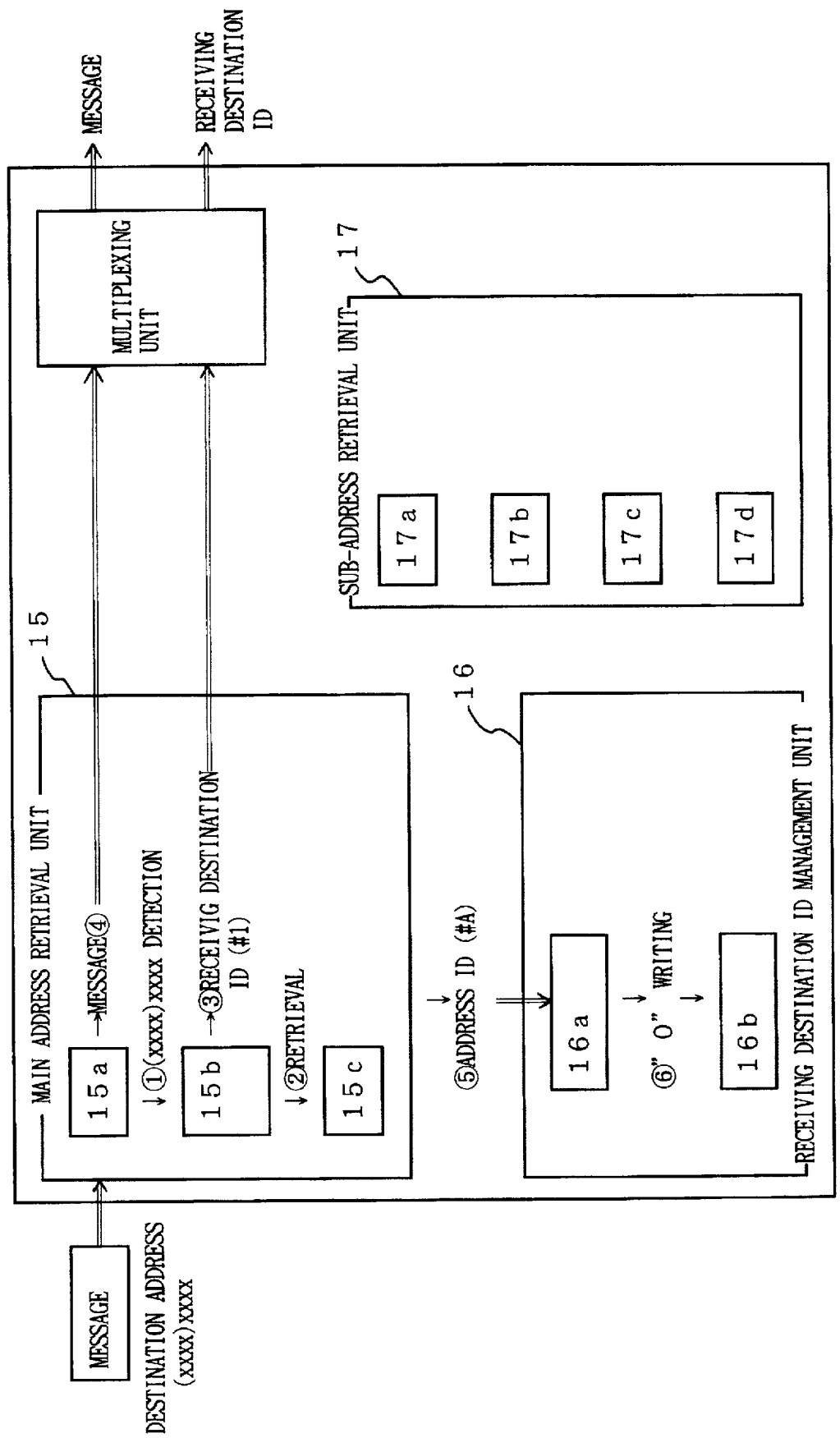
FIG. 11 is an operation image (1) of the routing processing unit according to the third embodiment.

Hereupon, the operation when the receiving destination ID (#1) of the terminal A is registered in the receiving destination ID memory 15c will be described using FIG. 11.

The receiving destination ID retrieval function unit 15b will transfer the receiving destination ID (#1) and the message to the multiplexing unit 18, if the receiving destination ID (#1) corresponding to the destination address (XXXX-XXXX)is stored in the receiving destination ID memory 15c. The main address retrieval unit 15 transmits the address ID (#A) to the address ID management unit 16 at the same time.

In the address ID management unit 16, the memory renewal function unit 16a retrieves the elapsed time storage unit 16b on the basis of the address ID (#A) to reset the elapsed time corresponding to the address ID (#A) to "0".

On the other hand, the multiplexing unit 18 receives the message and the receiving destination ID (#1) from the main address retrieval unit 15, and multiplexs these information to notify them to the exchange 13.

Accordingly, the exchange 13 switches the switching circuit on the basis of the receiving destination ID (#1) to transmit the message from the port "#1" indicated by the receiving destination ID to the terminal A.

Figure 12:
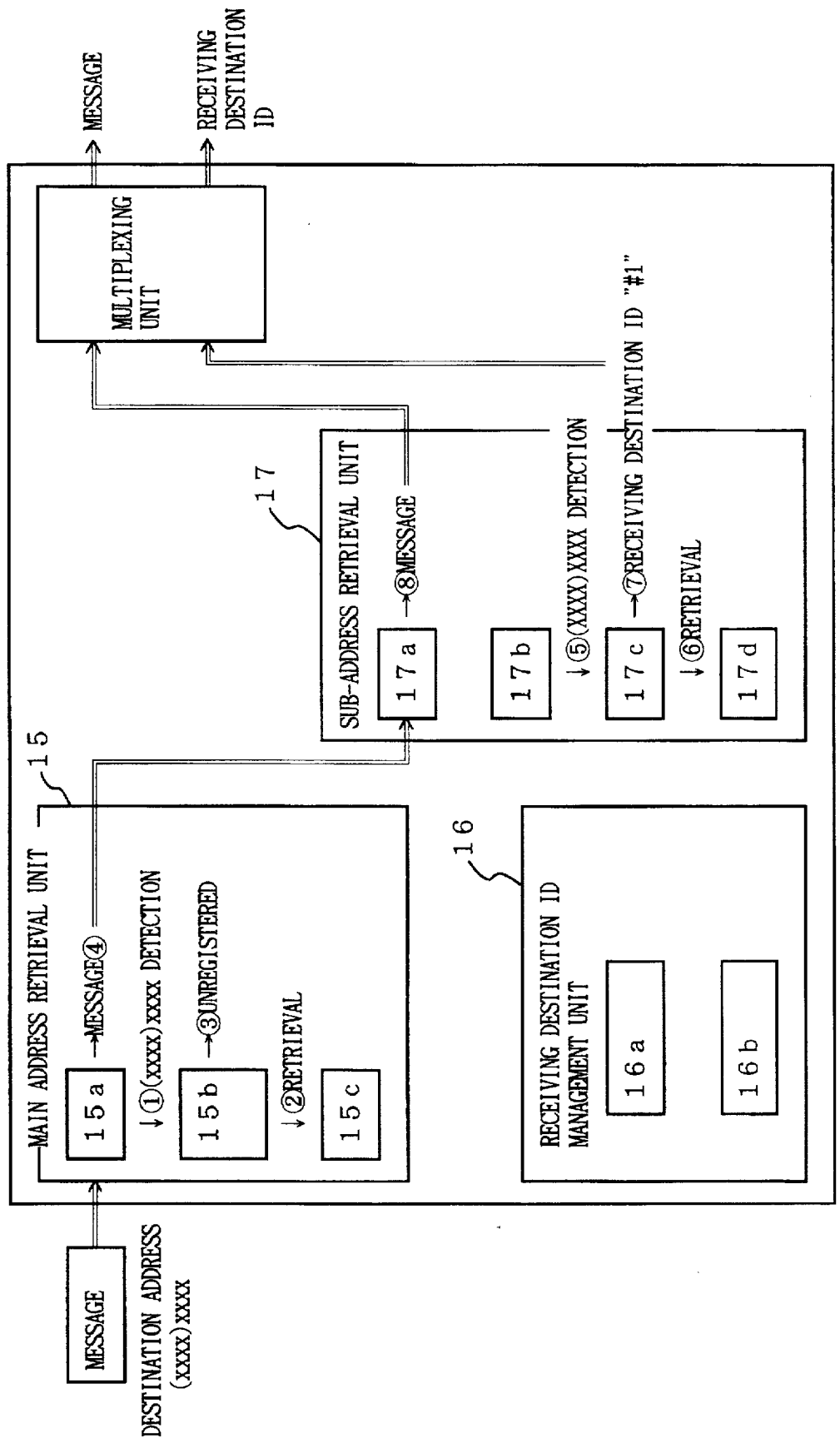
FIG. 12 is an operation image (2) of the routing processing unit according to the third embodiment.

The operation when the receiving destination ID of the terminal A is not registered in the receiving destination ID memory 15c will be described using FIG. 12.

The main address retrieval unit 15 will notify the message to the sub-address retrieval unit 17, if the receiving destination ID retrieval function unit 15b detects that the receiving destination ID is unregistered.

The message buffer 17a of the sub-address retrieval unit 17 stores the messages transmitted from the main address retrieval unit 15 temporarily.

At this moment, the destination address detection function unit 17b analyzes the message stored in the message buffer 17a to detect the destination address (XXXX-XXXX) of the terminal A, and notifies it to the receiving destination ID retrieval function unit 17c.

The receiving destination ID retrieval function unit 17c accesses to the database 17d on the basis of the destination address (XXXX-XXXX) notified by the destination address detection function unit 17b to detect the receiving destination ID (#1) of the terminal A.

Then the sub-address retrieval unit 17 transmits the message and the receiving destination ID (#1) to the multiplexing unit 18.

The multiplexing unit 18 multiplexs the message and the receiving destination ID (#1) received from the sub-address retrieval unit 17, and transmits them to the exchange 13.

Accordingly, the exchange 13 switches the switching circuit to transmit the message from the port (#1) indicated by the receiving destination ID.

Further, the sub-address retrieval unit 17 notifies the destination address (XXXX-XXXX) and the receiving destination ID (#1) of the terminal A to the address ID management unit 16 after transmitting the message and the receiving destination ID to the multiplexing unit 18 and asks the address ID management unit 16 to register them to the main address retrieval unit 15.

Figure 13:
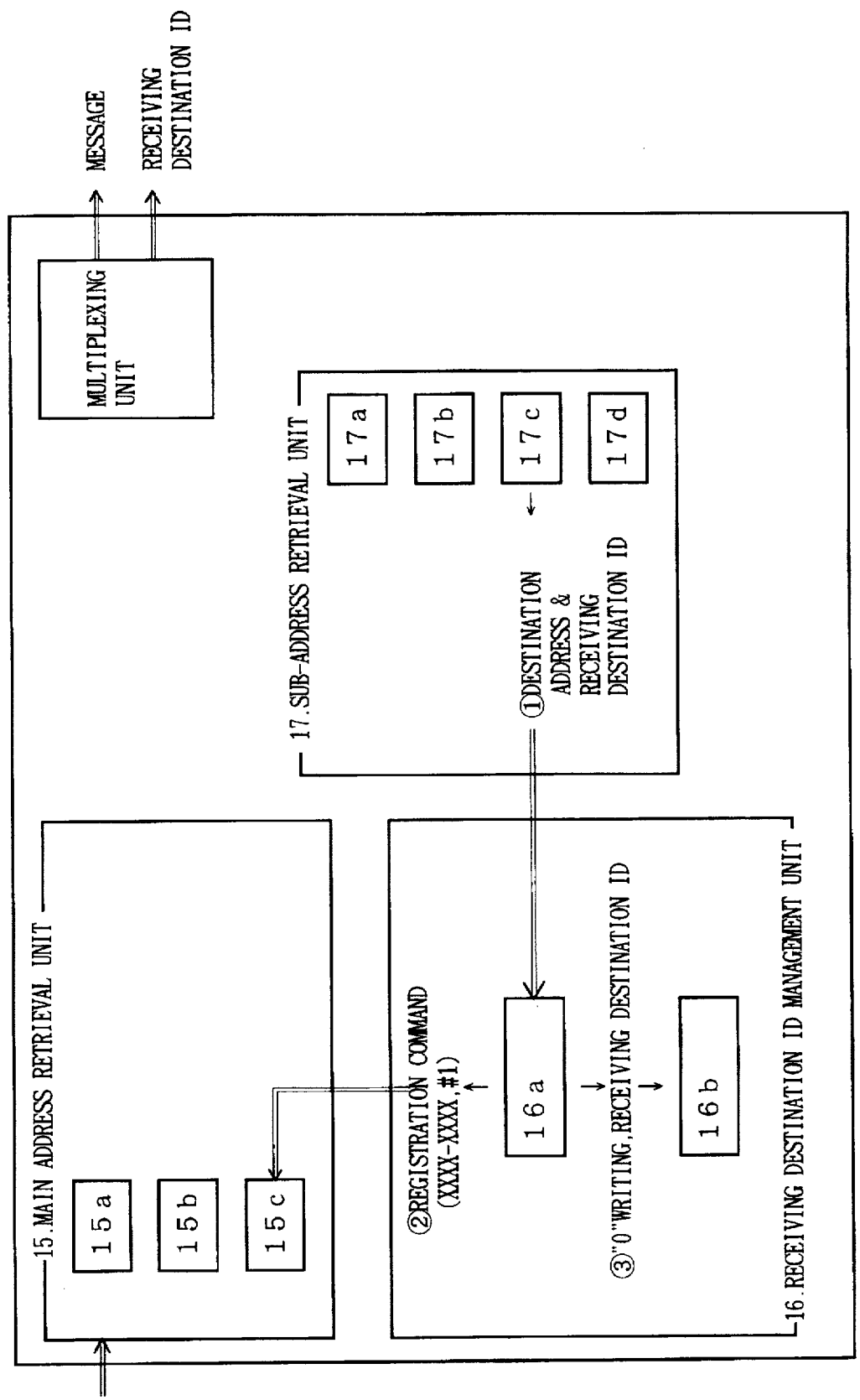
FIG. 13 is an operation image (3) of the routing processing unit according to the third embodiment.

The procedures for registering the receiving destination ID to the main address retrieval unit 15 will be described using FIG. 13.

The address ID management unit 16 activates the memory renewal function unit 16a after receiving the destination address (XXXX-XXXX) and the address ID (#1) of the terminal A from the sub-address retrieval unit 17.

The memory renewal function unit 16a writes the destination address (XXXX-XXXX) and the address ID (#1) received from the sub-address retrieval unit 17 into an vacant area of the receiving destination ID memory 15c.

Further, the memory renewal function unit 16a registers address ID (#A) indicating a registration area of the receiving destination ID memory 15c and an initial value "0" of the elapsed time to the elapsed time storage unit 16b.

Figure 14:
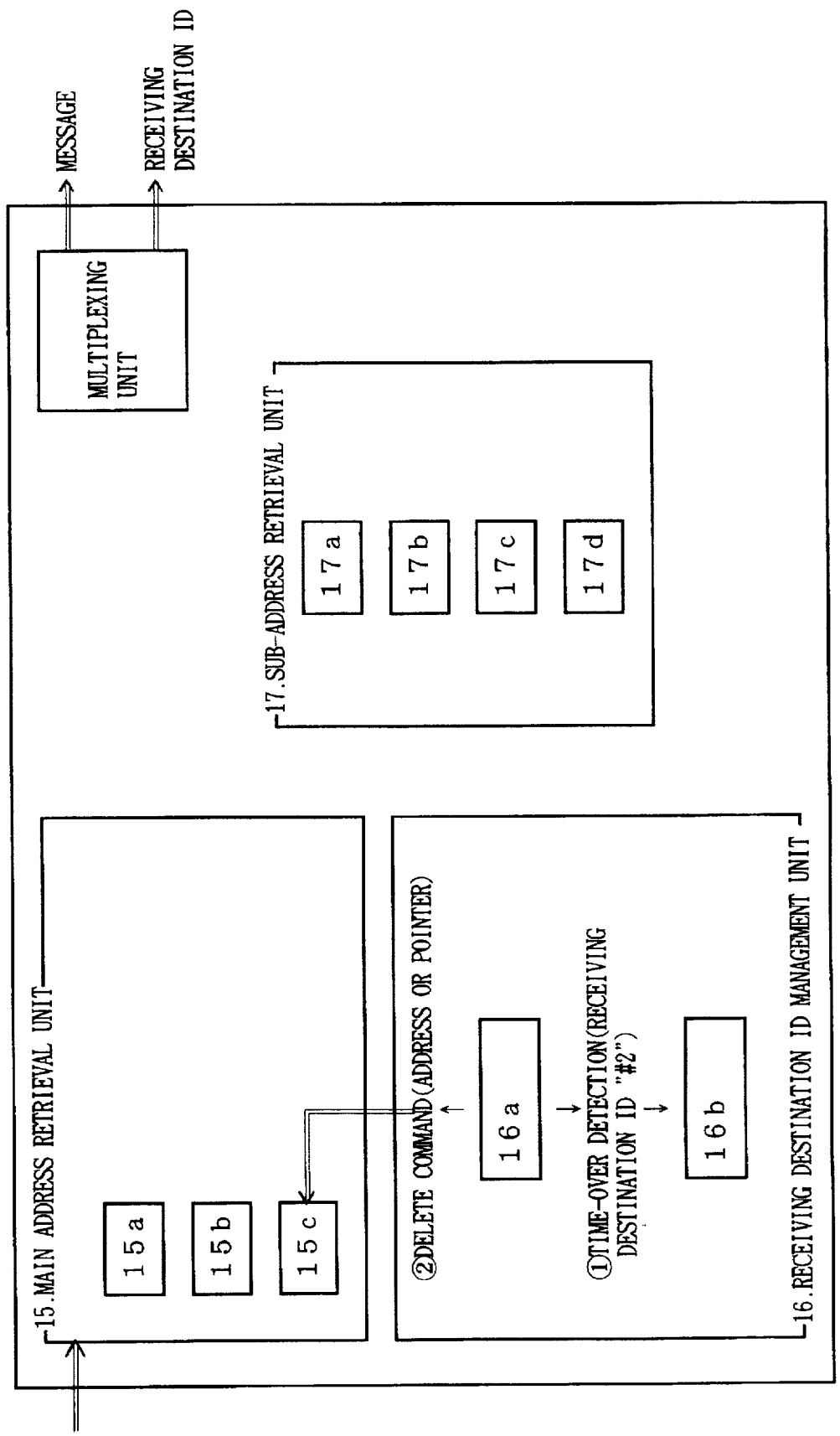
FIG. 14 is an operation image (4) of the routing processing unit according to the third embodiment.
Figure 15:
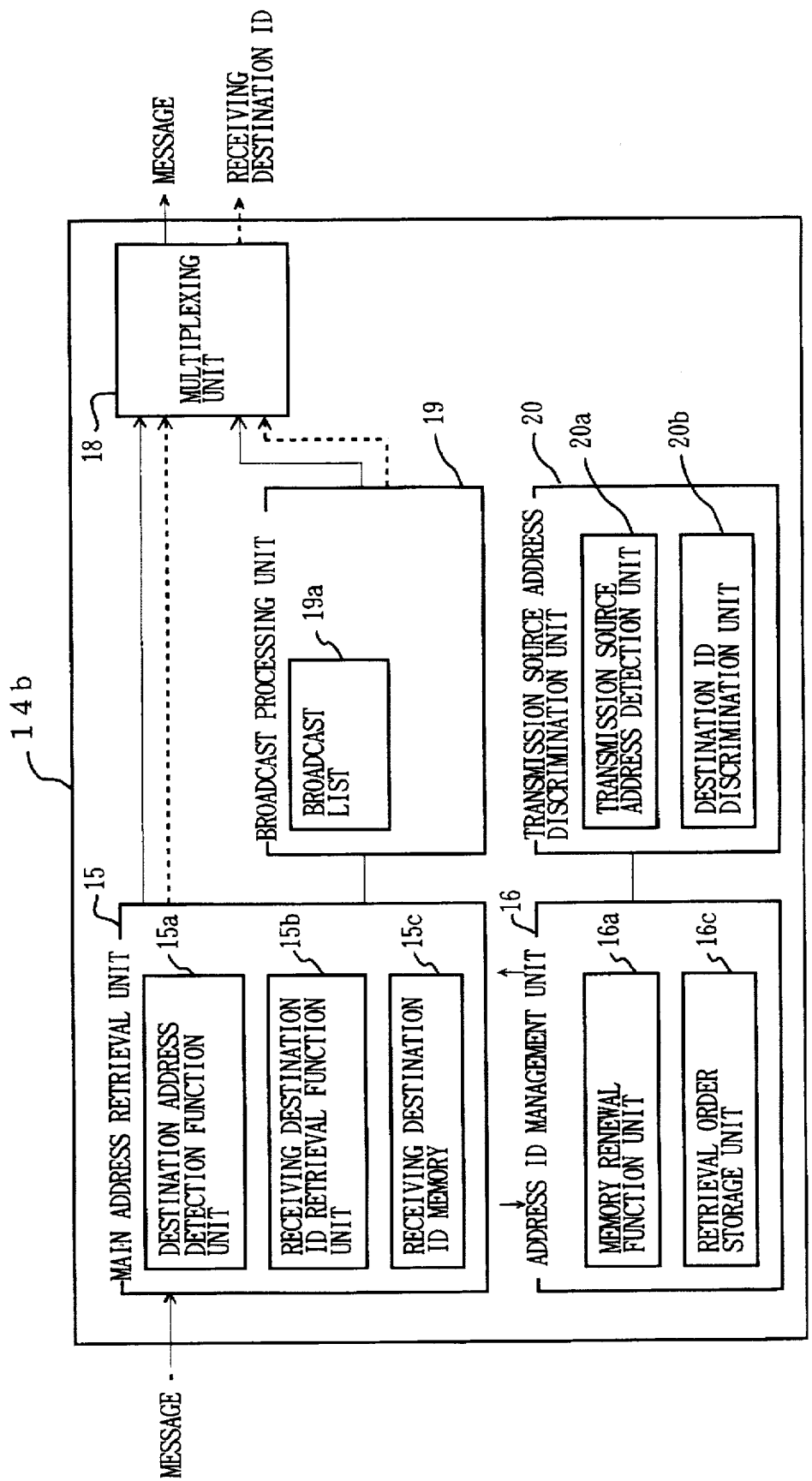
FIG. 15 is a block diagram by function of the routing processing unit according to the fourth embodiment.

Besides, the memory renewal function unit 16a is monitoring the elapsed time storage unit 16b independent of the above-mentioned processing to execute the renewal processing of the memory. The renewal processing of the memory will be described using FIG. 14.

The memory renewal function unit 16a monitors the elapsed time since the last retrieval time of each address ID registered in the elapsed time storage unit 16b.

At this moment, the memory renewal function unit 16b detects the address ID which has elapsed the fixed time since the last retrieval time to read an address ID. Then, the memory renewal function unit 16b accesses to the receiving destination ID memory 15c to delete the destination address and the receiving destination ID stored in the area indicated by the address ID.

As mentioned hereinbefore, according to the third embodiment, a real-time-message-transferring can be executed, since only the receiving destination ID whose use frequency is high will be registered to the main address retrieval unit 15, so it will be possible to retrieve these receiving destination IDs at a high speed.

According to the third embodiment, the delete unit and the routing information writing unit of the present invention can be provided separately, even though they are communized in the memory renewal function unit. Besides, the routing writing unit can be provided as a function of the sub-address retrieval unit 17. Further, a portion or all of the functions of the connectionless server can be provided within the exchange. Besides, the functions of the sub-address retrieval unit can be communized in a plural of connectionless servers.

<Fourth Embodiment>

The device for transferring messages of the fourth embodiment comprises an exchange 13 and a connectionless server 14 like the above-mentioned embodiment 3.

<Construction of Connectionless Server>

The connectionless server 14 comprises a format checking unit 14a and a routing processing unit 14b. The function of the format checking unit 14 is the same as the third embodiment, so the description about it will be omitted.

(1) Routing Processing Unit 14b

The construction by function of the routing processing unit according to the fourth embodiment is shown in FIG. 10.

The routing processing unit of the fourth embodiment comprises a main address retrieval unit 15, an address ID management unit 16, a broadcast processing unit 19 and a transmission address discrimination unit 20, in contrast to the construction of the above-mentioned third embodiment.

Hereupon, the construction and the function of the main address retrieval unit 15 are the same as the third embodiment, so the description about them will be omitted.

Broadcast Processing Unit 19

The broadcast processing unit 19 has a function for transmitting the messages from the exchange 13 to all of the transferable terminals and other exchanges simultaneously, when the receiving destination ID recognizes the message which is not registered in the main address retrieval unit 15.

Further, the inside of the broadcast processing unit is provided with a broadcast list 19a in which a destination address of the terminal to be broadcasted, a receiving destination ID of the port connected to each exchange, a prefix of the exchange to be broadcasted and a receiving destination ID of the port connected to each exchange are registered (See FIG. 16). Moreover, the broadcast list 19a makes it a rule to store the receiving destination ID of the all ports which are capable of setting the transmission route to the destination terminal, in addition to the receiving destination ID of the port connected to each terminal or each exchange. For instance, the broadcast list 19a tries to register the receiving destination ID of the port connected to the exchange A and the receiving destination ID of the port connected to the exchange B, when the message can be transmitted from both the exchange A and the exchange B to the destination terminal of the message. The broadcast processing unit 19 notifies all of the receiving destination IDs registered in the broadcast list 19a to the exchange 13. Accordingly, the exchange 13 transmits the above-mentioned massages simultaneously from all of the ports corresponding to the notified address ID.

Transmission Source Address Discrimination Unit 20

The transmission source address discrimination unit 20 comprises a transmission source address detection unit 20a and a destination ID discrimination unit 20b.

The transmission source address detection unit 20a has a function for analyzing a message and discriminating the transmission source. To put it concretely, the transmission source address detection unit 20a has a function for discriminating the address of the transmission source terminal of the message.

The destination ID discrimination unit 20b has a function for discriminating the destination ID. The method for discriminating the destination ID discriminates the transmitting route of the message by referring to the switching circuit information of the exchange 13. The destination ID discrimination unit 20b specifies the transmitting route to the terminal on the basis of the receiving route. Accordingly, the destination ID discrimination unit 20b can discriminate the destination ID added to the port on the transmission route.

Address ID Management Unit 16

The address ID management unit 16 comprises a retrieval order storage unit 16c and a memory renewal function unit 16a.

The retrieval order storage unit 16c stores an address ID which specifies a registration area of each receiving destination in the receiving destination ID memory 15c, and stores these address IDs in order beginning with the address ID whose last retrieval time is the oldest.

The memory renewal function unit 16a deletes the receiving destination ID of an address ID stored in the most significant address of the retrieval order storage unit 16c from the receiving destination ID memory 15c, when the transmission source address discrimination unit 20 discriminates the address and the destination ID of the terminal. The memory renewal function unit 16a has a function for writing the address and the destination ID discriminated by the transmission source address discrimination unit 20 into the memory area vacated by the delete.

The operation of the routing processing unit 14b according to the fourth embodiment will be described as follows.

<Operation of Routing Prcessing Unit 14b>

A message addressed to the terminal B of FIG. 6 will be explained as an example.

The routing processing unit 14b inputs the message into the main address retrieval unit 15 after receiving the message addressed to the terminal B from the format checking unit 14a.

The destination address detection function unit 15a of the main address retrieval unit 15 detects a destination address (YYYY-YYYY) of the terminal B from the message, and notifies it to the receiving destination ID retrieval function unit 15b.

The receiving destination ID retrieval function unit 15b retrieves the receiving destination ID memory 15c on the basis of the destination address (YYYY-YYYY) to discriminate whether the receiving destination ID (#2) of the terminal A is registered or not.

Figure 17:
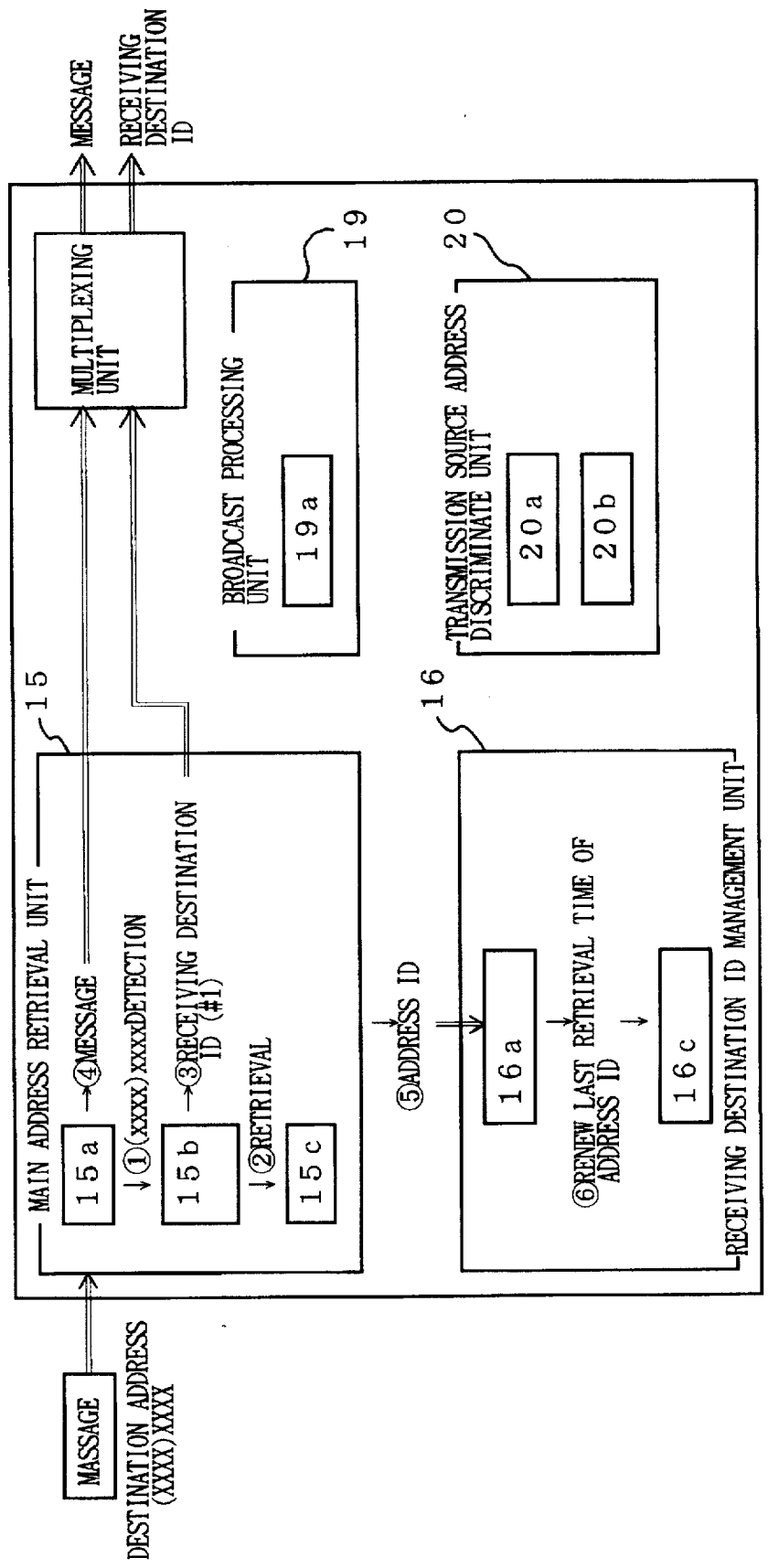
FIG. 17 is an operation image (1) of the routing processing unit according to the fourth embodiment.

Hereupon, the operation when the receiving destination ID (#2) of the terminal B is registered in the receiving destination ID memory 15c will be described using FIG. 17.

The receiving destination ID retrieval function unit 15b will transfer the receiving destination ID (#2) and the message to the multiplexing unit 18, if the receiving destination ID (#2) corresponding to the destination address (YYYY-YYYY) is stored in the receiving destination ID memory 15c. At the same time, the main address retrieval unit 15 transmits an address ID which specifies a registration position of the receiving destination ID (#2) to the address ID management unit 16.

In the address ID management unit 16, the memory renewal function unit 16a renews the registration order of the address ID of the retrieval order storage unit 16c.

On the other hand, the multiplexing unit receives the message and the receiving destination ID (#2), and multiplexs these informations to notify them to the exchange 13.

Accordingly, the exchange 13 switches the switching circuit on the basis of the receiving destination ID (#2) to transmit the message to the terminal B from the port "#2" indicated by the receiving destination ID.

Figure 18:
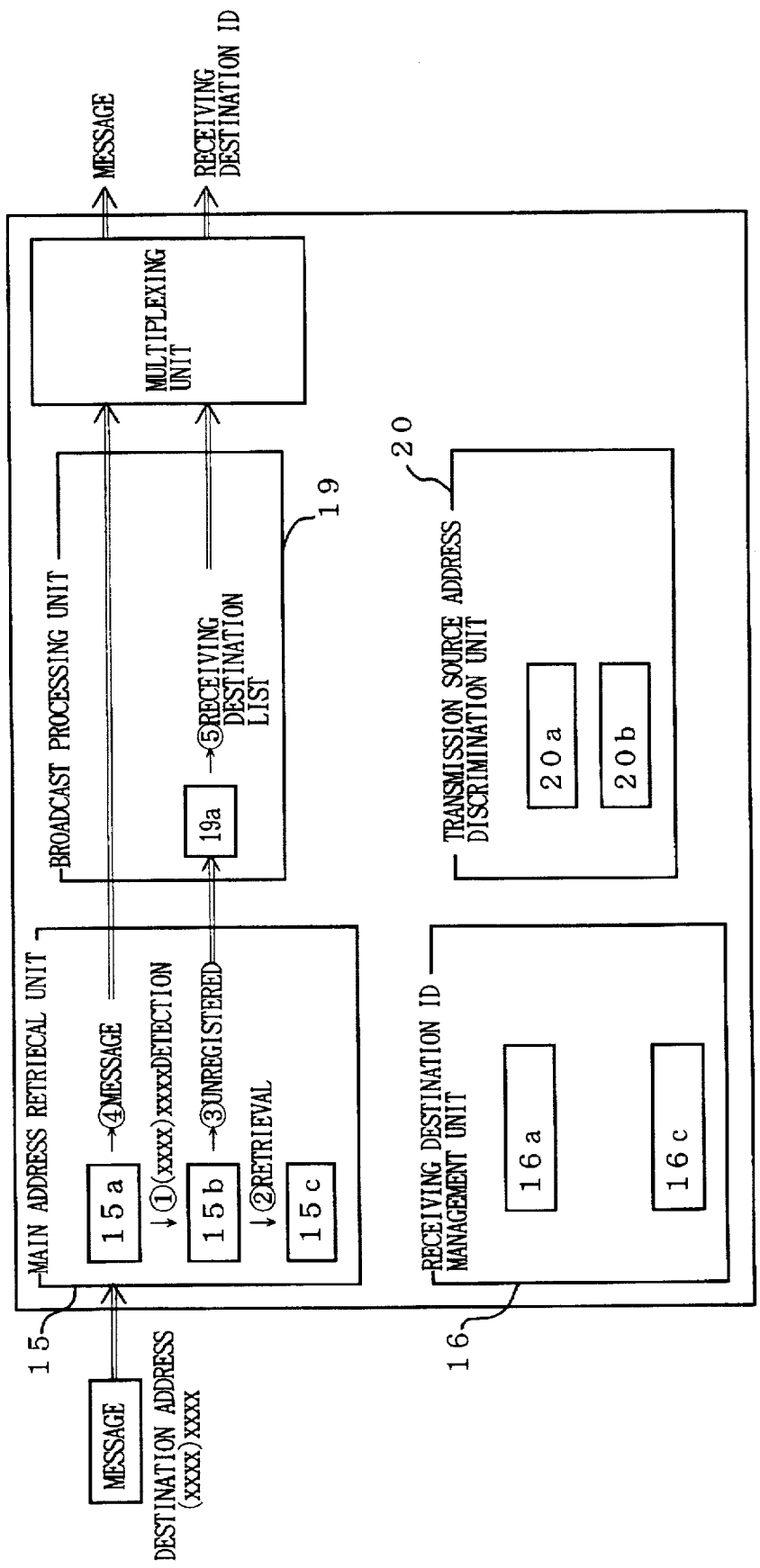
FIG. 18 is an operation image (2) of the routing processing unit according to the fourth embodiment.

The operation of the routing processing unit 14b when the receiving destination ID (#2) of the terminal B is not registered in the receiving destination ID memory 15c will be described using FIG. 18.

The main address retrieval unit 15 will notify the message addressed to the terminal B to the broadcast processing unit 19, if the receiving destination ID retrieval function unit 15b detects that the destination address ID is unregistered.

The broadcast processing unit 19 receives the message from the main address retrieval unit 15 to read the destination address and the receiving destination ID registered in the broadcast processing unit 19a. Then, the broadcast processing unit 19 notifies the message, the destination address and the receiving destination ID to the exchange 13.

Accordingly, the exchange 13 can transmit the message to the terminal and the exchange registered in the broadcast list 19a on the basis of the destination address and the receiving destination ID notified by the broadcast processing unit 19.

Figure 19:
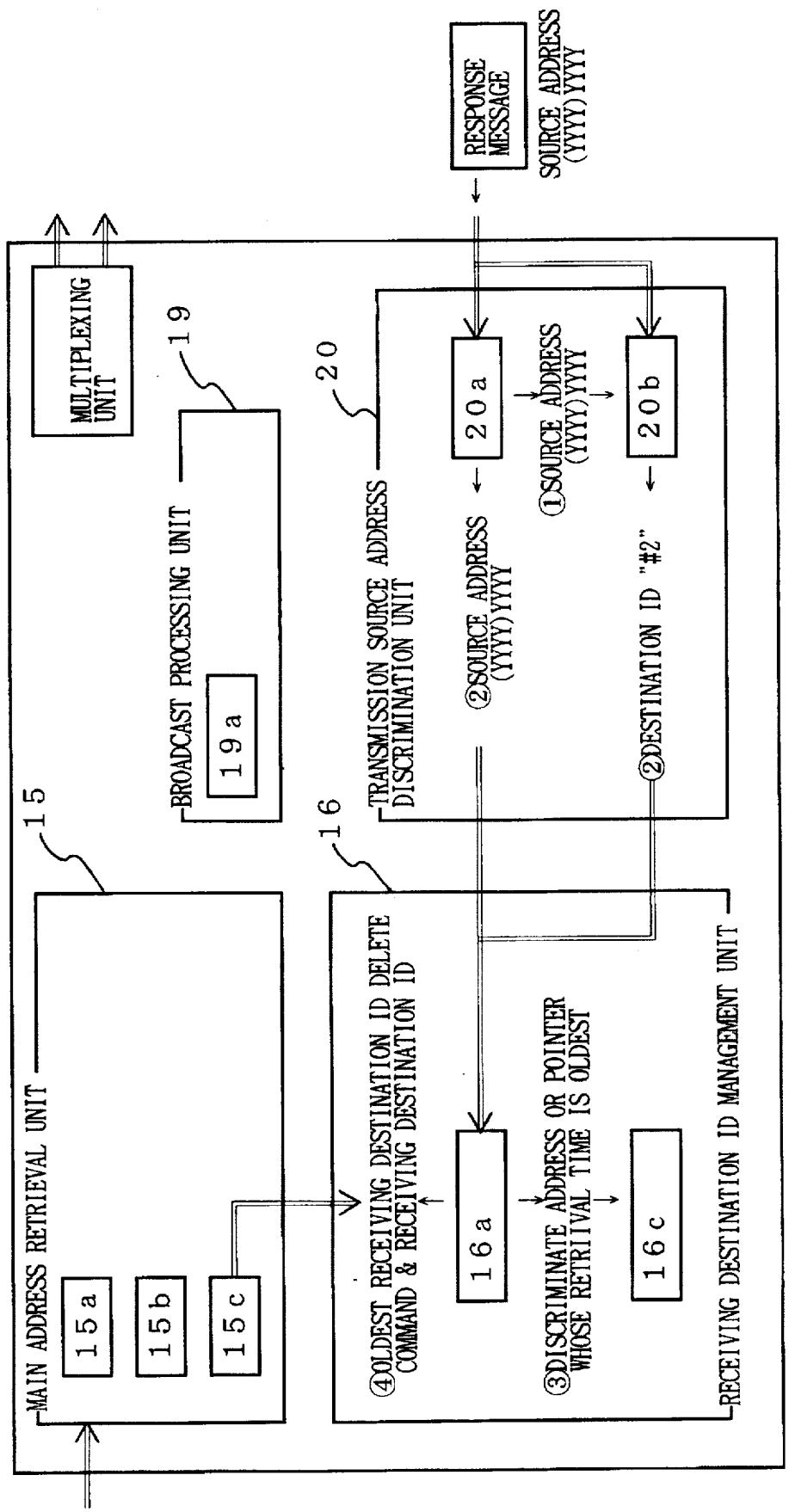
FIG. 19 is an operation image (3) of the routing processing unit according to the fourth embodiment.

The operation when the message is received will be described using FIG. 19 as follows.

The routing processing unit 14b activates the transmission source address discrimination unit 20 after receiving the response message from the terminal B which is an address of the message.

The transmission source address detection unit 20a of the transmission source address discrimination unit 20 analyzes the message to detect the destination address (YYYY-YYYY) of the terminal B, and notifies the destination address (YYYY-YYYY) to the destination ID discrimination unit 20b.

The destination ID discrimination unit 20b discriminates the receiving route of the message by referring to the switching circuit information of the exchange 13, after receiving the destination address (YYYY-YYYY) from the transmission source address detection unit 20a. The destination ID discrimination unit 20b specifies the transmission route to the terminal B on the basis of the receiving route. Further, the destination ID discrimination unit 20b discriminates the destination ID added to the port on the transmission route. Hereupon, the transmission source address discrimination unit 20 transmits the destination address (YYYY-YYYY) detected by the transmission source address detection unit 20a and the address ID discriminated by the destination ID discrimination unit 20b to the memory renewal function unit 16a.

If the destination address detected by the transmission source address detection unit 20a is not registered in the receiving destination ID memory 15c, the memory renewal function unit 16a discriminates an address ID of the address ID whose last retrieval time is the oldest by referring to the retrieval order storage unit 16c, after receiving the destination ID from the destination ID discrimination unit 20b. Then, the memory renewal function unit 16a accesses to the receiving destination ID memory 15c on the basis of the address ID to delete the destination ID whose last retrieval time is the oldest and the destination address. Hereupon, the memory renewal function unit 16a registers the destination ID received from the destination ID discrimination unit 20b and the address to a vacant area occurred by deleting the destination ID and the destination address, and registers an address ID which specifies the registration area of the destination ID and the destination address to the retrieval order storage unit 16c.

As mentioned hereinbefore, according to the method for transferring messages of the fourth embodiment, if the message transmitted firstly from the transmitting destination terminal is transmitted to the receiving destination terminal by the broadcast, when the message is transmitted to the receiving destination terminal whose the destination ID is not registered in the main address retrieval unit 15, the destination ID of the receiving destination terminal can be registered to the main address retrieval unit 15 when the message transmitted from the transmitting destination terminal responding to it is received, and the message transmitted from the transmitting destination terminal after the registration can be transmitted to the receiving destination terminal at the real time.

The frequency of the retrieval can be calculated to delete the destination IDs in order beginning with the destination ID whose frequency of the retrieval is the oldest, even though in the embodiment 4, the destination IDs are deleted in order beginning with the destination ID whose last retrieval time is the oldest out of the destination IDs registered in the receiving destination ID memory.

What is claimed is:

1. A method for transferring messages in connectionless communication, comprising:

a destination address detection step for detecting a destination address added to a message when an exchange receives the message;

a main retrieval step for retrieving routing information corresponding to a prescribed number of destination addresses from a first registration means, which holds less than all destination addresses and corresponding routing information, and detecting routing information, if possible, corresponding to the destination address detected in the destination address detection step;

a sub retrieval step for retrieving routing information corresponding to all destination addresses supported by the exchange from a second registration means and detecting the routing information corresponding to the destination address detected in the destination address detection step, when the routing information corresponding to the destination address detected in the destination address detection step in the main retrieval step is not detected in the first registration means; and a routing information notification step for notifying the routing information detected in the main retrieval step or the sub-retrieval step to the exchange.

2. A method for transferring messages in connectionless communication, comprising:

a destination address detection step for detecting a destination address added to a message, when an exchange receives the message;

a main retrieval step for retrieving routing information corresponding to a prescribed number of destination address from a first registration means, which holds less than all destination addresses and corresponding routing information, and detecting the routing information, if possible, corresponding to the destination address detected in said destination address detection step;

a routing information notification step for notifying the routing information detected in the retrieval step to the exchange; and a broadcast step for transferring the message to all of the exchanges or the terminals supported by the exchange, when the routing information corresponding to the destination address is not detected in the first registration means in the retrieval step.

3. A method for transferring messages to connectionless communication, comprising:

a destination address detection step for detecting a destination address added to a message, when an exchange receives the message;

a main retrieval step for retrieving routing information corresponding to a prescribed number of destination addresses from a first registration means, which holds less than all destination addresses and corresponding routing information, and detecting the routing information, if possible, corresponding to the destination address detected in the destination address detection step;

a routing information notification step for notifying the routing information detected in the main retrieval step to the exchange; and a broadcast step for transferring the message to at least one exchange or to the terminal specified by the destination address, when the routing information corresponding to the destination address is not detected in the first registration means in said main retrieval step.

4. A method for transferring messages in connectionless communication according to claim 1, further including:

a address management step for writing the routing information detected by said sub-retrieval step into said first registration means.

5. A method for transferring messages in connectionless communication according to claim 2, further comprising:

a sub retrieval step for retrieving routing information corresponding to all of the destination addresses supported by the exchange from a second registration means and detecting the routing information corresponding to the destination address detected by said destination address detection step after a message is transferred by said broadcast step; and an address management step for writing the routing information detected by said sub-retrieval step into said first registration means.

6. A method for transferring messages in connectionless communication according to claim 1, further comprising:

a transmission-source-address-detection step for detecting a destination address of the transmission source of the message from said message, when the exchange receives a message;

a routing-information-specifying-step for specifying the routing information transmitted from the exchange to the transmission source on the basis of a receiving route of the message; and an address management step for writing the routing information specified by said routing-information-specifying-step and the address of the transmission source detected by said transmission-source-address-detection-step into said first registration means.

7. A method for transferring messages in connectionless communication according to claim 4, wherein said address management step comprises:

a frequency of retrieval discrimination step for discriminating the routing information whose frequency of the retrieval is the smallest out of the each routing information registered in said first registration means; and a rewriting step for rewriting the routing information discriminated by said frequency of retrieval discrimination step into the routing information detected by said sub-retrieval step, or into the routing information specified by said routing information specifying step.

8. A method for transferring messages in connectionless communication according to claim 4, wherein said address management step comprises:

a retrieval-time-discrimination-step for discriminating the routing information which has elapsed the fixed time since the last retrieval time out of the each routing information registered in said first registration means;

a delete step for deleting the routing information discriminated by said retrieval-time-discrimination step from said first registration means; and a routing information writing step for writing the routing information detected by said sub-retrieval step or the routing information specified by said routing information specifying step into the area in which the information was deleted by said delete step.

9. A method for transferring messages in connectionless communication according to claim 4, wherein said address management step comprises:

a last-retrieval-time-discrimination step for discriminating the routing information whose last retrieval time is the oldest out of the each routing information registered in said first registration means; and a rewriting step for rewriting the routing information discriminated by said last-retrieval-time-discrimination step into the routing information detected by said sub-retrieval step or the routing information specified by said routing information specifying step.

10. A connectionless server comprising:

destination address detection means for detecting a destination address added to a message, when an exchange receives the message;

main retrieval means for retrieving routing information corresponding to a prescribed number of destination addresses from a first registration means, which holds less than all destination addresses and corresponding routing information, and detecting the routing information, if possible, corresponding to the destination address detected by said destination address detection means;

sub-retrieval means for retrieving routing information corresponding to all the destination addresses from a second registration means, which holds all destination addresses and corresponding routing information, and detecting the routing information corresponding to the destination address detected by said destination address detection means, when the routing information corresponding to the destination address detected by said destination address detection means is not detected in said first registration means; and a routing information notification means for notifying the routing information detected by said main retrieval means or said sub-retrieval means to the exchange.

11. A connectionless server comprising:

destination address detection means for detecting a destination address added to the message, when an exchange receives a message;

main retrieval means for retrieving routing information corresponding to a prescribed number of destination addresses from a first registration means, which holds less than all destination addresses and corresponding routing information, and detecting, if possible, routing information corresponding to the destination address detected by said destination address detection means;

routing information notification means for notifying the routing information detected by said main retrieval means to the exchange; and broadcast means for transferring the messages to all of the exchanges or the terminals connected to the exchange, when the routing information corresponding to the destination address detected by said destination address detection means is not detected in said first registration means.

12. A connectionless server comprising:

destination address detection means for detecting a destination address added to the message;

main retrieval means for retrieving routing information corresponding to the prescribed number of destination addresses from a first registration means, which holds less than all destination addresses and corresponding routing information, and detecting, if possible, routing information corresponding to the destination address on the basis of the destination address detected by said destination address detection means;

routing information notification means for notifying the routing information detected by said main retrieval means to the exchange; and broadcast means for transferring the message to at least one of the exchanges or the terminal specified by the destination address, when the routing information corresponding to the destination address detected by said destination address detection means is not registered in said first registration means.

13. A connectionless server according to claim 10, further comprising:

an address management means for writing the routing information detected by said sub-retrieval means into said first registration means.

14. A connectionless server according to claim 11 further comprising:

a sub-retrieval means for retrieving routing information corresponding to all destination addresses from a second registration means and detecting the routing information corresponding to the destination address detected by said destination address detection means, after the message is transferred by said broadcast means; and an address management means for writing the routing information detected by said sub-retrieval means into a rewriting unit for rewriting the routing information discriminated by said frequency of retrieval discrimination unit into the routing information detected by said sub-retrieval means or the routing information specified by said routing information specifying means.

15. A device for transferring messages in connectionless communication according to claim 10, wherein the connectionless server comprises:

a transmission source address detection means for detecting the address of the transmission source of the message from said message, when the exchange receives a message;

a routing information specifying means for specifying the routing information transmitted from the exchange to the transmission source on the basis of the receiving route of the message; and an address management means for writing the routing information specified by said routing information specifying means and the address of the transmission source detected by said transmission source address detection means into said first registration means.

16. A device for transferring messages in connectionless communication according to claim 13, wherein said address management means comprises:

a frequency of retrieval discrimination unit for discriminating the routing information whose frequency of the retrieval is the smallest out of the routing informations registered in said first registration means; and a rewriting unit for rewriting the routing information discriminated by said frequency of retrieval discrimination unit into the routing information detected by said sub-retrieval means or the routing information specified by said routing information specifying means.

17. A connectionless server according to claim 13, wherein said address management means comprises:

a retrieval-time-discrimination unit for discriminating the routing information which has elapsed the fixed time since the last retrieval time out of the routing information registered in said first registration means;

a delete unit for deleting the routing information discriminated by said retrieval-time-discrimination unit from said first registration means; and a routing information writing unit for writing the routing information detected by said sub-retrieval means or the routing information specified by said routing information specifying means into the area deleted by said delete unit.

18. A connectionless server according to claim 13, wherein said address management means comprises:

a last-retrieval-time-discrimination unit for discriminating the routing information whose last retrieval time is the oldest out of the routing information registered by said first registration means;

a rewriting unit for rewriting the routing information discriminated by said last-retrieval-time-discrimination unit into the routing information detected by said sub-retrieval means or into the routing information specified by said routing information specifying means.

19. A method of transferring message comprising:

storing all destination addresses and corresponding routing information in a second register:

storing the most likely destination addresses out of allowed destination addresses and corresponding routing information in a first register; and when a message to be sent it is received by an exchange:
    detecting a destination address of the message;
    attempting to find routing information corresponding to the detected destination address in the first register;
    if the corresponding routing information is not in the first register, finding the corresponding routing information in the second register; and
    transferring the corresponding routing information to the exchange which will transfer the message in accordance with the corresponding routing information.

20. A method of transferring messages comprising:

storing the most likely destination addresses and corresponding routing information in a first register; and when a message to be sent is received by an exchange:
    detecting a destination address of the message;
    attempting to find routing information corresponding to the detected destination address in the first register;

when the corresponding routing information is found in the first register, transferring the corresponding routing information to the exchange which will transfer the message in accordance with the corresponding routing information; and when the corresponding routing information is not found in the first register transferring the message to at least one other exchange for processing.

* * * * *